United States Patent
Epple et al.

(10) Patent No.: US 7,256,932 B2
(45) Date of Patent: Aug. 14, 2007

(54) OPTICAL SYSTEM FOR ULTRAVIOLET LIGHT

(75) Inventors: Alexander Epple, Aalen (DE); Toralf Gruner, Aalen-Hofen (DE); Wolfgang Singer, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 11/252,598

(22) Filed: Oct. 19, 2005

(65) Prior Publication Data
US 2006/0119750 A1   Jun. 8, 2006

Related U.S. Application Data

(60) Provisional application No. 60/619,698, filed on Oct. 19, 2004.

(51) Int. Cl.
G02B 13/14 (2006.01)
G02B 1/06 (2006.01)

(52) U.S. Cl. ............... 359/350; 359/351; 359/355; 359/358; 359/665

(58) Field of Classification Search ........ 359/350–361, 359/664–667; 355/52, 53, 55
See application file for complete search history.

(56) References Cited

U.S. PATENT DOCUMENTS

| 5,353,156 A | 10/1994 | Chung |
| 5,446,591 A | 8/1995 | Medlock |
| 5,532,880 A | 7/1996 | Robb |
| 5,627,674 A | 5/1997 | Robb |
| 6,600,608 B1 | 7/2003 | Shafer et al. |
| 2005/0179877 A1 | 8/2005 | Mulkens et al. |
| 2005/0190435 A1 | 9/2005 | Shafer et al. |
| 2005/0219707 A1* | 10/2005 | Schuster et al. ............ 359/665 |
| 2005/0248856 A1 | 11/2005 | Omura et al. |

FOREIGN PATENT DOCUMENTS

| EP | 1 524 558 A1 | 4/2005 |
| WO | WO 03/075049 A2 | 9/2003 |
| WO | WO 2005/050324 A2 | 6/2005 |

OTHER PUBLICATIONS

U.S. Appl. No. 60/536,248, Shafer et al.
U.S. Appl. No. 60/632,550, filed Dec. 1, 2004, Weippert et al.

* cited by examiner

Primary Examiner—Scott J. Sugarman
Assistant Examiner—Darryl J. Collins
(74) Attorney, Agent, or Firm—Sughrue Mion, PLLC

(57) ABSTRACT

An optical system for ultraviolet light having wavelengths $\lambda \leq 200$ nm, which may be designed in particular as a catadioptric projection objective for microlithography, has a plurality of optical elements including optical elements made of synthetic quartz glass or a fluoride crystal material transparent to a wavelength $\lambda \leq 200$ nm. At least two of the optical elements are utilized for forming at least one liquid lens group including a first delimiting optical element, a second delimiting optical element, and a liquid lens, which is arranged in an interspace between the first delimiting optical element and the second delimiting optical element and contains a liquid transparent to ultraviolet light having wavelengths $\lambda \leq 200$ nm. This enables effective correction of chromatic aberrations even in the case of systems that are difficult to correct chromatically.

32 Claims, 5 Drawing Sheets

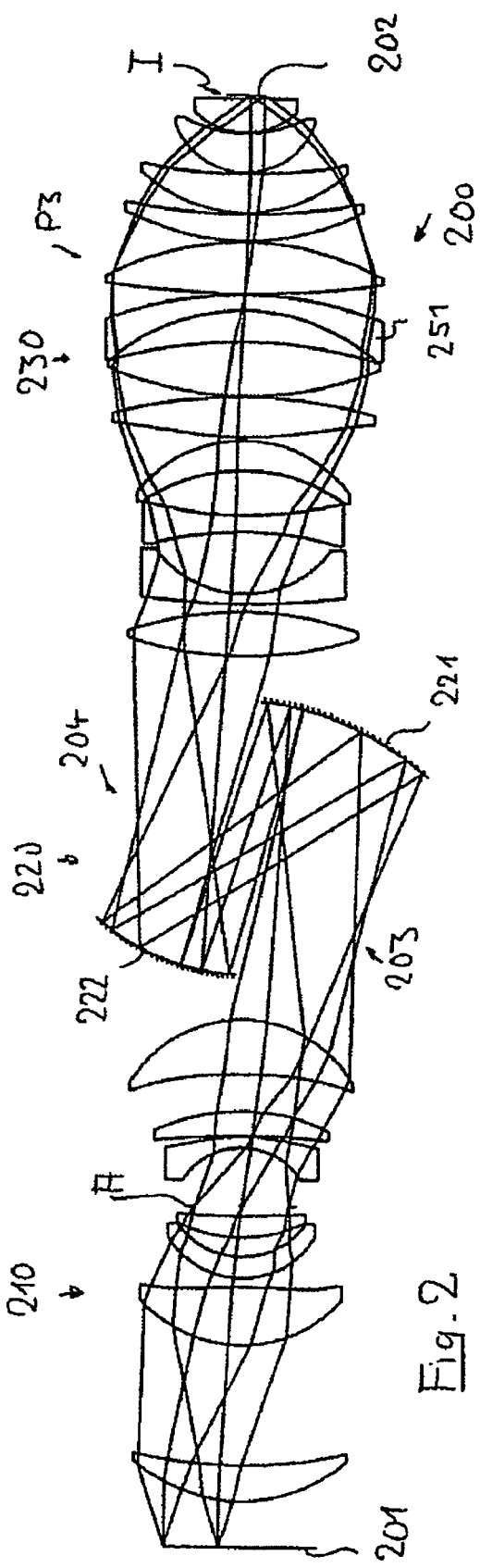
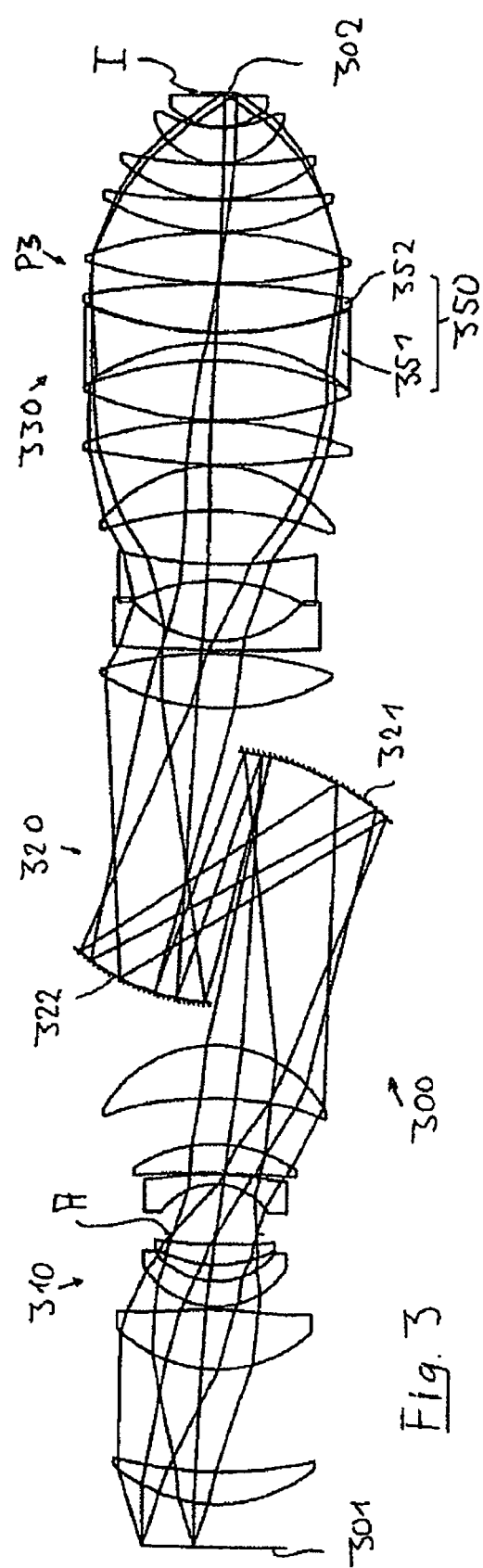
Fig. 2
Fig. 3

OPTICAL SYSTEM FOR ULTRAVIOLET LIGHT

This application claims benefit from U.S. provisional application No. 60/619,698 filed on Oct. 19, 2004, the disclosure of which is incorporated herein by reference.

BACKGROUND OF THE INVENTION

1. Field of the Invention

The invention relates to an optical system for ultraviolet light having wavelengths $\lambda \leq 200$ nm. A preferred field of application is projection objectives for microlithography.

2. Description of the Related Art

Optical systems that can be used in the deep ultraviolet range (DUV) at wavelengths $\lambda \leq 200$ nm are required for example in microlithography projection exposure apparatuses for the fabrication of semiconductor components and other finely patterned devices. They may be provided as projection objectives for projecting patterns of photomasks or reticles, which are referred to generally hereinafter as masks or reticles, onto a light-sensitive object, in particular a semiconductor wafer coated with a light-sensitive layer, with a high resolution on a demagnifying scale. In order to be able to produce ever finer structures in this case, on the one hand the image-side numerical apertures NA of the projection objectives are increased further and further, and on the other hand shorter and shorter wavelengths are used, in particular ultraviolet light at $\lambda \leq 200$ nm, for example at 193 nm or 157 nm.

In principle, it is possible to work with purely refractive (dioptric) projection objectives, the production of which is readily controllable on account of their rotational symmetry about the optical axis. For very small resolutions, however, it is necessary in this case to work with numerical apertures NA of more than 0.8 or 0.9, which can be realized only with difficulty in dry systems with a sufficiently large working distance on the image side. Refractive immersion systems which enable values of NA>1 by the use of an immersion liquid having a high refractive index between objective exit and image plane have also already been proposed.

At wavelengths $\lambda \leq 200$ nm, however, there are only few sufficiently transparent materials available for producing the transparent optical elements. They include primarily synthetic quartz glass (fused silica), which is sufficiently transparent down to 193 nm, and also some fluoride crystal materials which still exhibit sufficiently low absorption even at wavelengths of 157 nm and below. In this case, primarily calcium fluoride and barium fluoride are of practical importance for the production of lenses and other optical elements; magnesium fluoride (birefringent), lithium fluoride, lithium calcium aluminum fluoride, lithium strontium aluminum fluoride or similar fluoride crystal materials are also taken into consideration for specific applications. However, since the Abbe constants of these materials are relatively close together, it becomes more and more difficult to provide purely refractive systems having sufficient correction of color errors (chromatic aberrations).

Therefore, catadioptric systems in which refractive and reflective components, in particular lenses and concave mirrors, are combined are often used for very high resolution projection objectives.

Many known catadioptric systems having one or two intermediate images have at least one concave mirror which is arranged in the region of a pupil surface of the optical system and in direct proximity to which is situated at least one negative lens. The negative lens near the pupil makes it possible to provide a chromatic overcorrection by means of which the chromatic undercorrection of other objective parts can be at least partly compensated for.

High-aperture projection objectives for microlithography, especially those for immersion operation, are intended to transport a high geometric light conductance and to provide an excellent optical correction for all beam bundles occurring therein. The geometric light conductance (also called etendue) is defined here as the product of image-side numerical aperture NA and image field size and represents a conservation variable of an optical imaging system. The conventional design approaches cannot achieve this object or can achieve it only with disproportionately high outlay. Refractive systems require a material deployment that increases exponentially with the aperture, and also aspheric forms that are difficult to manufacture. The catadioptric systems with folding mirrors for beam splitting often have structural space problems and a high material deployment may likewise be necessary.

In order to avoid the aforementioned problems, catadioptric projection objectives with at least two intermediate images have been proposed. In this case, systems having an even number of concave mirrors which, in terms of the design, are constructed rotationally symmetrically with respect to the optical axis have turned out to be advantageous for the optical correction, specifically the correction of the image field curvature (Petzval error), in conjunction with at the same time low material deployment and good constructability and alignability.

The applicant's U.S. Pat. No. 6,600,608 B1 shows a catadioptric projection objective having a first, refractive subsystem, which generates a first intermediate image, a second, catadioptric subsystem, which generates a second intermediate image from the first intermediate image, and a third, refractive subsystem, which images the second intermediate image into the image plane. The catadioptric subsystem has two concave mirrors facing one another with central holes, in the region of which lie the intermediate images. A negative meniscus lens for color correction is fitted before each of the concave mirrors. The system is well corrected with regard to chromatic longitudinal aberrations (CHL) and chromatic transverse aberrations (CHV), but has a pupil obscuration on account of the perforations of the reflective mirror surfaces.

The U.S. provisional application bearing Ser. No. 60/536,248 and with an application date of Jan. 14, 2004 shows various axially symmetrically constructed catadioptric systems with three concatenated imaging systems which image an object into an image plane whilst generating two intermediate images. These systems comprise two concave mirrors facing one another which are arranged eccentrically with respect to the optical axis and, if appropriate, alongside the optical axis and are illuminated asymmetrically. The radiation is guided past the concave mirrors laterally in a manner free of rignetting. This enables an obscuration-free imaging with extremely high numerical apertures, values of NA=1.3 or greater being attainable in conjunction with an immersion liquid. It has been shown that such advantageous systems are comparatively difficult to correct chromatically.

In order to achieve a predetermined degree of correction of chromatic aberrations in the case of purely refractive systems, from among the available materials it is necessary to find suitable material combinations for the refractive optical components. It is already known from the field of refractive optical systems to resort to liquid, transparent materials for forming liquid lenses. The U.S. Pat. No. 5,627,674 discloses chromatically corrected lens systems that are intended to permit passage of light with a small wavefront error over a wide spectral range of ultraviolet light between approximately 250 nm and approximately 450 nm. A lens system comprises a first rigid lens element, a second rigid lens element and a liquid lens arranged in an interspace formed between the lens elements. Depending on the embodiment, the fixed lenses consist of synthetic quartz glass or sapphire ($Al_2O_3$). The liquids used for the liquid lenses are, inter alia, carbon tetrachloride ($CCl_4$), a hexane or a specific perfluoromethyldecalin in accordance with a predetermined specification. No statements are made with regard to the use of these inherently chromatically corrected liquid lens groups.

The U.S. Pat. No. 5,532,880 shows various laser beam expansion systems with lens elements made of lithium fluoride (LiF), barium fluoride (BaF) or potassium bromide (KBr) which are intended to enable a diffraction-limited beam expansion for a wide wavelength range between approximately 240 nm and 2500 nm without generation of an intermediate image. The beam expansion system contains a liquid lens group in which a spectrally pure liquid is arranged between two lenses made of the same material (lithium fluoride, barium fluoride or potassium bromide) that delimit an interspace, said liquid being a siloxane having a defined specification which is selected such that the solid materials and the liquid are inert with respect to one another.

The European patent application EP 1 524 558 A1 with application number 03256499.9 and application date Oct. 15, 2003 (corresponding to US 2005/179877 A) describes a projection system for immersion lithography. In one embodiment, the immersion liquid introduced between the last optical element of the projection objective and the substrate is utilized as a manipulator for shifting/tilting the last optical element in order to produce different focus positions of the projection radiation for so-called "focus drilling".

Immersion lithography is possible, for example, in the deep ultraviolet range (DUV) at about 248 nm, about 193 nm or about 157 nm wavelength. Water is a frequently proposed immersion liquid due to its transparency at 193 nm. Fluoridized and siloxan-based liquids are discussed as immersion liquids for 157 nm. In international patent application WO 2005/050324 A2 published on Jun. 2, 2005 measures are described for increasing the refractive index of immersion liquids by using additives.

SUMMARY OF THE INVENTION

It is one object of the invention to provide an optical system for ultraviolet light having wavelengths of $\lambda \leq 200$ nm which, in comparison with conventional optical systems for this wavelength range, has more degrees of freedom for the optical design, and in particular more degrees of freedom for the optical correction. It is another object to provide an optical system that is suitable as a projection objective for a microlithography projection exposure apparatus and which permits high numerical apertures which, with the use of an immersion liquid having a high refractive index, also enable effective numerical apertures NA>1 for image generation.

To address these and other objects the invention, according to one formulation of the invention, provides an optical system for ultraviolet light having wavelengths $\lambda \leq 200$ nm comprising:

a plurality of optical elements comprising optical elements made of synthetic quartz glass or a fluoride crystal material transparent to a wavelength $\lambda \leq 200$ nm;

at least two of the optical elements being utilized for forming at least one liquid lens group comprising a first delimiting optical element;

a second delimiting optical element; and a liquid lens, which is arranged in an interspace between the first delimiting optical element and the second delimiting optical element and contains a liquid transparent to ultraviolet light having wavelengths $\lambda \leq 200$ nm.

The use of a liquid transparent to the useful light in the interspace makes it possible to considerably extend the spectrum of the materials available for forming transparent optical components. The restriction to a small number of suitably transparent solids with their fixedly predetermined optical properties in particular with regard to refractive index and dispersion is eliminated. An improved color correction that is thereby possible with the aid of refractive components can open up new degrees of design freedom elsewhere in the optical system since these system parts can at least partly be relieved of the burden of color correction tasks. Within a liquid lens group, moreover, with the use of liquids whose refractive index is significantly closer to the refractive index of the adjacent solid lenses and to the refractive index of gases, significantly smaller index jumps occur at the solid-liquid interfaces, so that the individual optical elements can have generous position tolerances despite high angles of incidence even in the case of greatly curved interfaces. This permits more relaxed beam guidance and it is possible to achieve a reduced sensitivity of the optical system toward misalignment.

The optical elements made of solid material may be produced exclusively from a single material, for example from synthetic quartz glass or from calcium fluoride. In this case, a second optical material for color correction may be provided by the liquid. It is also possible for at least two different solid materials to be utilized, for example synthetic quartz glass in combination with one or more fluoride crystal materials. In this case, a third or fourth optical material may be made available by the liquid.

In one development, the liquid has, at an operating wavelength of the optical system, a dispersion $D_L$ greater than the dispersion $D_S$ of the highest dispersive solid material used for the optical elements at the operating wavelength, and the interspace has the form of a negative lens. As a result, it is possible with the aid of the liquid to provide a highly dispersive diverging lens which, in interaction with at least one positive lens made of a solid material having less wavelength dependence of its refractive index, enables an effective color correction in particular of the chromatic longitudinal aberration CHL. The term "dispersion" here designates the refractive dispersion $dn/d\lambda$ describing the wavelength dependence of the refractive index of a transparent material. The dispersion $D_L$ may in particular be higher than that of synthetic quartz. In the case of a negative liquid lens, the axial extent of the interspace increases from the optical axis toward the edge, so that the center thickness is less than the edge thickness, a biconcave interspace preferably being formed.

It is also possible for the liquid to have, at an operating wavelength of the optical system, a dispersion $D_L$ less than the dispersion of the least refractive solid material used for the optical elements. The dispersion $D_L$ may in particular be less than that of calcium fluoride. In this case, it is expedient if the liquid lens has the form of a positive lens. In particular, the interspace may be formed in biconvex fashion. As a result, it is possible with the aid of the liquid to provide a low-dispersive positive lens which, in interaction with at least one adjacent negative lens made of a solid material with greater dispersion, enables an effective color correction.

Preferred optical systems are designed as imaging systems for imaging a pattern arranged in a first surface into a second surface, which is optically conjugated with respect to the first surface. In the case of projection objectives for microlithography, a mask (reticle) may be arranged in the first surface (object surface) and a wafer to be exposed may be arranged in the second surface (image surface). The optical system may be designed in such a way that a direct imaging is effected without an intermediate image. It is also possible for one or more intermediate images to be generated between the first and second surfaces, said intermediate images lying in the region of further field surfaces of the system. Pupil surfaces of the imaging lie between the field surfaces. In preferred embodiments, the interspace or the liquid lens is arranged in a region of the optical system that is near the pupil. The liquid lens thus lies at least partly in a pupil surface or in optical proximity thereto. A "region that is near the pupil" in this sense is distinguished in particular by the fact that, in the region which is near the pupil, the marginal ray height of the imaging is larger than the principal ray height. Preferably, the marginal ray height in the region of the liquid lens is at least twice as large as the principal ray height. A negative lens in the region of large marginal ray heights may contribute particularly effectively to the color correction, in particular to the correction of the chromatic longitudinal aberration CHL.

If the optical system has at least one intermediate image, so that two or more pupil surfaces exist between object surface and image surface, then a liquid lens is preferably arranged in the region of that pupil surface at which the largest absolute marginal ray heights occur, since a particularly effective color correction is possible as a result of this.

In one development, the liquid lens has the form of a negative lens and the liquid has a refractive index $n_L$ less than the refractive index of the materials for other optical elements of the optical system. In particular, the liquid may have the lowest refractive index of all transparent materials in the wavelength range of interest. This is of importance particularly in the case of optical imaging systems for microlithography, where, on the one hand, large, overall positive refractive power is required for producing high numerical apertures and, on the other hand, color errors may occur to a disturbing extent even in the case of the narrow-band light sources that are usually used. If the negative refractive power (which is desired for the color correction) is provided by a diverging lens having a low refractive index, then resultant diverging lenses have a comparatively low refractive power, so that they have less of an adverse effect on the overall desired converging effect of the overall system in comparison with negative lenses made of materials having a higher refractive index.

Preferably, at least one of the two delimiting optical elements of a negative liquid lens is a positive lens made of fluoride crystal material. Since these materials have the lowest dispersion values of the available transparent solid materials, a high dispersion difference, which is favorable for an effective chromatic correction, can be realized in conjunction with a highly dispersive liquid lens. Preferably, both delimiting optical elements are positive lenses which expediently consist of fluoride crystal material, in particular of calcium fluoride.

An effective color correction is also possible if the two delimiting optical elements are negative lenses, for example made of calcium fluoride, and the enclosed liquid lens is an, in particular, biconvex positive lens whose liquid has a lower dispersion than the delimiting optical elements.

In one development, the liquid used for forming the liquid lens substantially consists of water ($H_2O$). Ultrapure water has very recently turned out to be a candidate for an immersion liquid having sufficient transparency and stability at an operating wavelength of 193 nm. A further advantage afforded by the use of a liquid lens material is that the relevant optical properties, in particular the dispersion and the refractive index, can be altered if appropriate by means of suitable additives. By way of example, by adding additives consisting of sulfates, alkali metals such as e.g. cesium or phosphates to water, it was possible to produce ionized liquids whose refractive index is higher than that of ultrapure water ($n_{H_2O} \approx 1.43$) (cf. Internet publication entitled "'Doped water' could extend 193-nm immersion litho" by D. Lammers, http://www.eetimes.com/semi/news/jan.2004). International patent application WO 2005/050324 also discloses additives suitable for increasing the refractive index of water. $Cs_2SO_4$ and $H_3PO_4$ in various concentrations are given as examples.

Dispersion-increasing additives may be advantageous when using water as a liquid for forming a diverging lens. As far as the additives mentioned in WO 2005/050324 have an dispersion-increasing effect, those can also be used for this purpose.

In the unpublished U.S. provisional application U.S. 60/632,550 filed on Dec. 1, 2004 and claiming priority of DE 10 2004 051 730 filed on Oct. 22, 2004 further substances suitable as immersion liquids for DUV microlithography are described. These substances may also be used as liquids for forming a liquid lens if compatible with the adjacent solid materials of the delimiting optical elements of the liquid lens. It may be advantageous if the immersion fluid is a cyclic or polycyclic hydrocarbon, which may preferably be saturated. Specifically, cycloalkan or a derivative of cycloalkan may be used, for example cyclohexan. Likewise, derivatives of cyclohexan, cyclooctan or cyclooctan-derivatives may be suitable. The composition decahydronaphtaline (decalin) has proven to be particularly useful amongs the polycyclic saturated hydrocarbons.

Immersion liquids based on perfluoropolyethers (PFPE) are favored at the present time for 157 nm. One tested immersion liquid has at 157 nm a refractive index $n_f \approx 1.37$ (cf. article: "Immersion lithography at 157 nm" by M. Switkes and M. Rothschild, J. Vac. Sci. Technol. B19 (6), November/December 2001, page 1 et seq.). From available data, for one immersion liquid that is suitable at 157 nm (trademark Fomblin®), it is possible to estimate a dispersion value $D_L$=0.001186/nm, which is lower than the dispersion of calcium fluoride at this wavelength ($D_S$=0.002259/nm). Therefore, in order to attain a color correction, it is advantageous to configure such liquid lenses as positive lenses, in which case the achromatizing effect may then essentially be provided by surrounding negative lenses made of calcium fluoride.

In the construction of the liquid lens group, care must be taken to ensure that the liquid used for the liquid lens is compatible with the optical materials of the optical elements delimiting the interspace. Ultrapure water can be in direct contact with synthetic quartz glass without interface degradations occurring in the long term. If the interface of a quartz glass element that faces the liquid is provided with an optical coating, then care must be taken to ensure compatibility with the liquid. With the use of calcium fluoride for an optical element delimiting the interspace, by contrast, it must be taken into account that calcium fluoride is soluble in water.

In an embodiment with a water lens in which at least one of the delimited optical elements consists of calcium fluoride, therefore, at least the interface of the optical element that faces the liquid is provided with a substantially water-impermeable optical coating which serves as a protective layer from a chemical standpoint and may be designed as an antireflection coating from an optical standpoint. The protective layer may be formed by a single material layer or by a layer stack having at least two material layers lying one above the other and made of different dielectric materials (dielectric alternating layer system). Suitable layer materials for the protective layer may be gathered in particular from the applicant's U.S. provisional patent application 60/530,623 with an application date of Dec. 19, 2003, the content of which is incorporated by reference in the content of this description If an optical system, for example a projection objective for microlithography, contains at least one liquid lens group of the abovementioned type, then said group, given a suitable design of its components, may also be utilized as a manipulator for dynamically influencing the imaging quality of the optical system. For this purpose, one preferred embodiment provides for a pressure generating device to be connected to the interspace between the delimiting optical elements, by means of which pressure generating device the liquid pressure of the liquid, in a targeted manner, can be increased above the ambient pressure prevailing within the optical system, and/or be decreased below said pressure. This makes it possible to provide a hydraulic manipulator for dynamically influencing the imaging properties of the optical system in a manner dependent on the liquid pressure of the liquid of the liquid lens. Preferably, for this purpose, at least one of the delimiting optical elements is formed such that it is elastically deformable and/or displaceable in a manner dependent on the liquid pressure. In this case, the liquid lens group may form an optical element that is transparent to the radiation passing through and has an entry surface and an exit surface, it being possible to vary the curvature of the entry surface and/or of the exit surface and/or the axial thickness of the optical element, measured between entry surface and exit surface, in a manner dependent on the pressure of the liquid.

In one embodiment, the hydraulically manipulable liquid lens group is designed such that it has no or only a small optical effect in a neutral position, for example an optical effect similar to that of a transparent plane-parallel plate perpendicular to the optical axis. In this case, the neutral position is that configuration which is adopted by the elements of the liquid lens group if, within the liquid lens, there is no excess pressure or no negative pressure relative to the ambient pressure. A transparent element with substantial refractive power can be produced by increasing or decreasing the liquid pressure proceeding from said neutral position, it being possible, for example by setting an excess pressure, to produce a positive lens whose refractive power depends on the liquid pressure.

These and further features emerge not only from the claims but also from the description and the drawings, in which case the individual features may be realized in each case on their own or as a plurality in the form of subcombinations in an embodiment of the invention and in other fields and may represent advantageous and intrinsically protectable embodiments. Exemplary embodiments of the invention are illustrated in the drawings and are explained in more detail below.

BRIEF DESCRIPTION OF THE DRAWINGS

FIG. 2 shows a reference system with respect to the system of FIG. 1 without a liquid lens;

FIG. 3 shows a reference system with respect to FIG. 1 without a liquid lens, but with a lens component;

DETAILED DESCRIPTION OF THE PREFERRED EMBODIMENTS

The invention is explained below on the basis of exemplary embodiments in which optical imaging systems are optimized in the form of projection objectives for microlithography in accordance with the invention.

Figure 1:
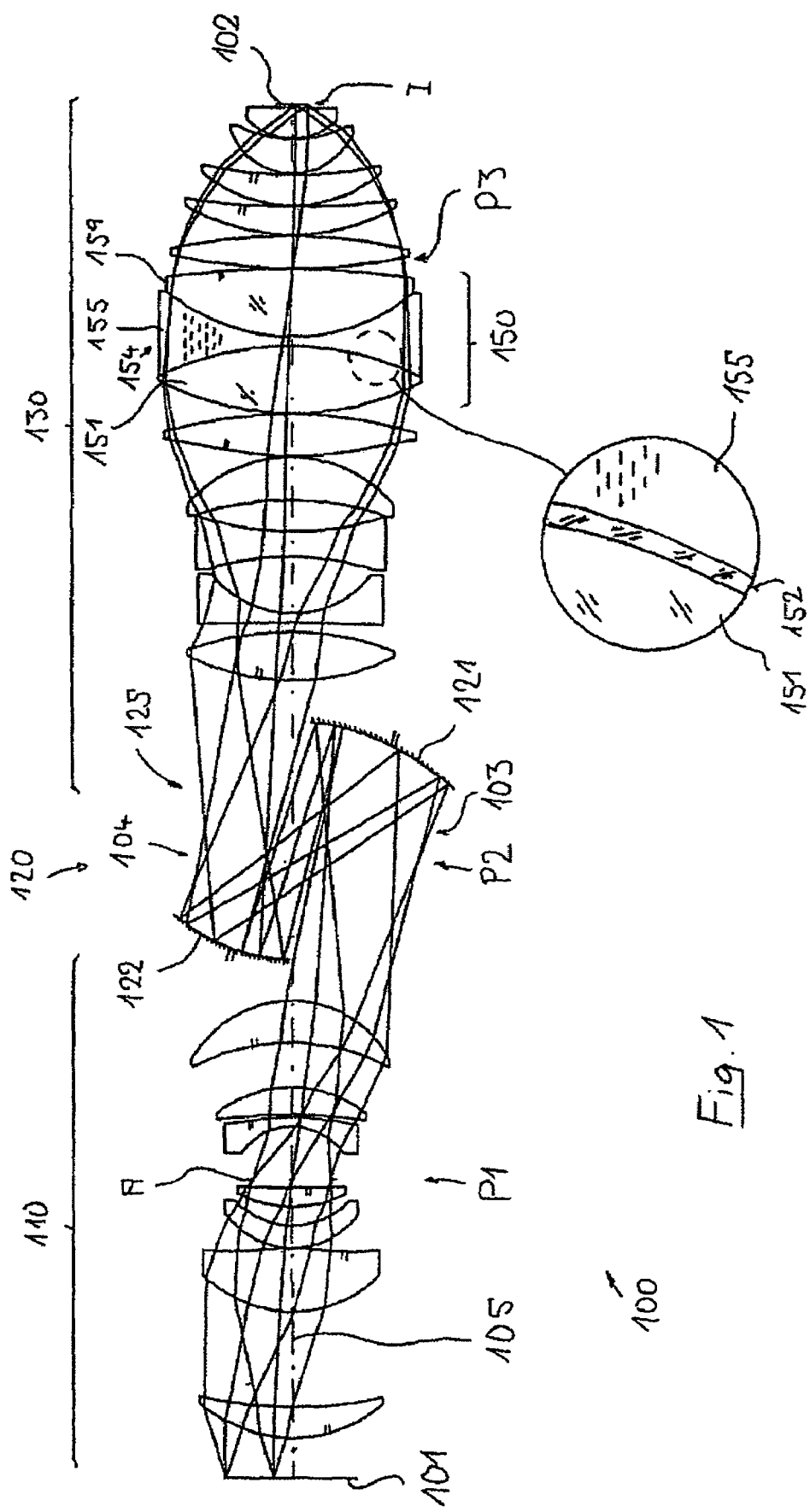
FIG. 1 shows a lens section through an embodiment of an optical system according to the invention which is designed as a catadioptric projection objective for microlithography at 193 nm.

FIG. 1 shows an embodiment of a catadioptric projection objective 100 designed as an immersion objective for an operating wavelength of approximately 193 nm. It is provided for imaging a pattern of a mask arranged in its object plane 101 onto its image plane 102 oriented parallel to the object plane, on a reduced scale, for example on a scale of 4:1. In this case, precisely two real intermediate images 103, 104 are generated between object plane and image plane. A first, purely refractive (dioptric) objective part 110 is designed in such a way that the pattern of the object plane is imaged into the first intermediate image 103 on a magnifying scale. A second, purely reflective (catoptric) objective part 120 images the first intermediate image 103 into the second intermediate image 104 essentially without any change in size (imaging scale approximately 1:1). A third, purely refractive (dioptric) objective part 130 is designed for imaging the second intermediate image 104 into the image plane 102 with high demagnification. In this case, operation of the projection objective involves radiating through a thin layer of an immersion liquid I situated between the exit surface of the projection objective and the image plane 102.

The second objective part 120 consists of a first concave mirror 121 with a concave mirror surface pointing toward the object plane 101, and a second concave mirror 122 with a concave mirror surface pointing toward the image plane 102. The aspheric mirror surfaces of the two mirrors are continuous, that is to say that they have no holes or perforations. Each of the mirror surfaces of the concave mirrors defines a curvature surface that is a mathematical surface which extends beyond the edges of the physical mirror surfaces and contains this mirror surface. The first and second mirror surfaces are parts of rotationally symmetrical curvature surfaces with a common axis of symmetry that coincides with the optical axes—arranged coaxially with respect to one another—of the first objective part 110 and of the third objective part 130. Therefore, the entire projection objective 100 is rotationally symmetrical and has a single, straight, unfolded optical axis 105 common to all the refractive and reflective optical components.

The mutually facing mirror surfaces of the concave mirrors 121, 122 delimit a catadioptric cavity 125 in the axial direction. The intermediate images 103, 104 both lie within this catadioptric cavity, at least the paraxial intermediate images lying in the central region between the concave mirrors at a relatively large optical distance from the latter. The concave mirrors have relatively small diameters, lie on different sides of the optical axis 105 and are obliquely illuminated abaxially. The imaging beam path running from the object plane to the image plane passes through the mirror edges facing the optical axis in each case in a manner free of vignetting.

Pupil surfaces of the imaging system lie between the object plane and the first intermediate image, between the first and second intermediate images, and also between the second intermediate image and the image plane, in each case where the principal ray of the optical imaging intersects the optical axis. The aperture diaphragm A of the system is fitted in the region of the pupil surface P1 of the first objective part 110. The pupil surface P2 within the catoptric second objective part lies at a relatively large optical distance from the concave mirrors 121, 122 in the central region of the catadioptric cavity 125, so that all the concave mirrors are optically remote from a pupil surface in a region in which the principal ray height of the imaging exceeds the marginal ray height of the imaging. The pupil surface P3 of the third objective part 130 is arranged on the image side of the region with the largest beam diameter and thereby lies unconventionally close to the image plane.

Insofar as reference is made to a "marginal ray height" or a "principal ray height" in this application, then these are taken to mean the paraxial marginal ray height and the paraxial principal ray height, even though the paraxial rays do not contribute to the imaging in the case of systems with abaxial object field and image field.

Table 1 summarizes the specification of the design in tabular form. In this case, column 1 specifies the number of a refractive surface or surface distinguished in some other way, column 2 specifies the radius r of the surface (in mm), column 3 specifies the distance d—designated as thickness—between the surface and the subsequent surface (in mm) and column 4 specifies the material of the optical components. Column 5 shows the refractive index of the material, and column 6 specifies the usable free radii or the free semidiameters of the lenses (in mm). The aspheric surfaces are identified by "*" in column 1. Table 1A specifies the corresponding aspheric data, the aspheric surfaces being calculated according to the following specification:

$$p(h)=[((1/r)h^2)/(1+SQRT(1-(1+K)(1/r)^2h^2))]+C1*h^4+C2*h^6+\ldots$$

In this case, the reciprocal (1/r) of the radius specifies the surface curvature and h specifies the distance between a surface point and the optical axis (i.e. the ray height). Consequently, p(h) specifies the so-called sagitta, i.e. the distance between the surface point and the surface vertex in the z direction (direction of the optical axis). The constants K, C1, C2, . . . are reproduced in Table 1A.

The system which is telecentric on the object side and on the image side is adapted to a refractive index of the immersion liquid I of $n_I$=1.44 and has an image-side numerical aperture NA=1.2. The objective has a structural length L (distance between image plane and objective plane) of approximately 1350 mm. Given an image size of approximately 16.5 mm, a geometrical light conductance (product of image-side numerical aperture and image size) of approximately 19.8 mm is achieved.

Catadioptric projection objectives of the basic construction described previously are shown for example in the applicant's U.S. provisional application bearing Ser. No. 60/536,248 and with the application date of Jan. 14, 2004. The disclosure of this application is incorporated by reference in the content of the present description. Such systems enable an obscuration-free imaging with extremely high numerical apertures, values of NA=1.3 or greater being attainable in conjunction with an immersion liquid. In this case, the second objective part 120, which, in other embodiments, may also be configured as a catadioptric objective part (with at least one transparent lens), provides for compensation of much of the image field curvature introduced by the refractive subsystems (Petzval correction), so that constructive means for Petzval correction can largely be dispensed with in these parts, which leads to an axially compact construction with moderate lens diameters. The correction of the chromatic longitudinal aberration (CHL) is made more difficult, however, by the fact that pupil surfaces with high marginal ray heights which can be utilized for achromatization by means of diverging lenses do not occur in the vicinity of the concave mirrors.

On the basis of two reference systems shown in FIGS. 2 and 3, firstly an explanation is given of how it is possible to achieve an achromatization, primarily with regard to the chromatic longitudinal aberration, by the use of different materials for the lenses in regions of the third objective part which are near the pupil.

In this respect, FIG. 2 shows a reference system with a two-mirror design, the basic construction of which corresponds to that of the system of FIG. 1. Identical or corresponding features are designated by the same reference symbols as in FIG. 1, increased by 100. The specification is given in Tables 2 and 2A (aspheric data).

In the case of the catadioptric reduction objective 200 designed for 193 nm, all of the lenses consist of synthetic quartz glass. A value of 312 nm/pm results for the chromatic longitudinal aberration CHL. As the smallest stage of achromatization, it is possible to replace some or all of the positive lenses by corresponding lenses made of calcium fluoride, for example the positive lenses before and after the negative meniscus lens 251 that is concave on the object side and is situated in the third objective part 230 in the region of very large marginal ray heights which is near the pupil.

In the case of the reference system 300 in FIG. 3, corresponding features are once again shown with the same reference symbols as in figure 1, increased by 200. The specification is given in Tables 3 and 3A (aspheric data).

An essential difference with respect to the system from FIG. 2 is that here a lens component 350 is arranged in the refractive third objective part 330 in the region of large marginal ray heights in direct proximity to the pupil surface P3. Said lens component has an object-side, biconcave negative lens 351 made of relatively highly dispersive synthetic quartz glass and a directly succeeding image-side, biconvex positive lens 352 made of—relative thereto—lower-dispersive calcium fluoride. The absolute value of the radius of curvature of the concave exit side of the negative lens 351 is only slightly greater than that of the convex entry side of the positive lens 352, so that the lenses can be brought together in axial proximity at a very small axial distance of approximately 1 mm and the surface distance is less than approximately 4 mm over the entire lens cross section. Whereas all the lenses of the first objective part 210 consist of synthetic quartz glass, positive lenses made of calcium fluoride are provided in the third objective part 230 primarily in proximity to the pupil. The narrow interspace between the lenses 351, 352 is not filled, but in a different embodiment may be filled with a medium n>1 in order to make the system less sensitive toward misalignments.

With this construction, the two-mirror design has a chromatic longitudinal aberration CHL of approximately 180 nm/pm.

In the case of the embodiment in accordance with FIG. 1, a significantly improved color correction is achieved by virtue of the fact that a liquid lens group 150 is arranged in the region of large marginal ray heights in direct proximity to the pupil surface P3 of the third objective part 130. Said liquid lens group comprises a biconvex lens 151 made of calcium fluoride as first, object-side delimiting optical element and a further biconvex lens 159, likewise produced from calcium fluoride, as second, image-side delimiting optical element. The mutually facing spherical convex surfaces of the delimiting optical elements 151, 159 delimit a biconcave interspace 154 in the axial direction, said interspace being delimited in the radial direction by a liquidtight lens holder for forming a fluid chamber. During operation of the projection objective, the interspace is filled with ultra-pure water, which thereby forms a biconcave liquid lens 155. In order to prevent the water from incipently dissolving and thereby damaging the water-soluble calcium fluoride of the delimiting positive lenses, the interfaces of the calcium fluoride lenses 151, 159 that face the liquid lens are in each case provided with a water-insoluble and water-impermeable protective layer 152. Suitable protective layer materials and material combinations are described in the applicant's U.S. provisional patent application bearing Ser. No. 60/530, 623 and with an application date of Dec. 19, 2003, the content of which is incorporated by reference in the content of this description. In the case of the example, the protective layer 152 is an individual layer made of silicon dioxide which has been applied in a coating method with ion assistance (Ion Assisted Deposition, IAD) and thereby forms a substantially watertight protective layer of low porosity which is substantially free of pores extending through from the outer side to the lens side. Since the refractive index of the coating material differs only slightly from that of water, only negligibly low reflection losses occur at this surface. It is also possible for the protective layer to be formed as a dielectric multilayer layer system, which may be designed as an antireflection layer from an optical standpoint in order to minimize the interface reflections at the solid/liquid interface.

The liquid lens group 150 has an advantageous effect on the correction of the chromatic longitudinal aberration. What is important for this is that at a wavelength of 193 nm, water has the highest dispersion of the transparent materials used within the projection objective. The dispersion of water at 193 nm is $D_{H2O} \approx 0.002/nm$, while $D_{SiO2} \approx 0.0015$ nm holds true for the dispersion of the synthetic quartz glass and $D_{CaF2} \approx 0.001/nm$ holds true for the dispersion of calcium fluoride. It is advantageous, moreover, that from the three materials water has the lowest refractive index at 193 nm, the following values approximately holding true here: $n_{H2O} \approx 1.437$, $n_{CaF2} \approx 1.501$ and $n_{SiO2} = 1.560$. As a result, diverging lenses produced therefrom have a comparatively low refractive power, so that they have less of an adverse effect on the overall desired converging effect of the third objective part in comparison with diverging lenses in the same form made of material having a higher refractive index. The chosen combination of the materials having highest and lowest dispersion, namely calcium fluoride for the positive lenses 151 and 159 and water for the negative lenses 155, is particularly effective with regard to the color correction. As is generally known, with regard to the color correction, a lens with converging refractive power should preferably be produced from material having low dispersion, while the assigned diverging lens should be made of maximum-dispersive material. This is advantageously provided in the case of the liquid lens group 150.

At the interfaces between the liquid lens 155 and the delimiting positive lenses 151 and 159, relatively small index jumps $\Delta n$ occur in comparison with solid/gas interfaces, the following holding true here: $\Delta n=0.064$. By virtue of the small jumps in refractive index, the system in this region becomes less sensitive to slight misalignments of the lenses involved relative to one another.

With regard to the risk of damage to the adjacent lens elements caused by the immersion liquid water, other embodiments may also provide for one or both of the delimited optical elements to be produced from synthetic quartz glass. With regard to the relatively small difference in refractive index between quartz glass and water, it is possible, if appropriate, to dispense with a reflection-reducing coating of the solid/liquid interface or to use a coating having a simple construction, for example a single layer.

The use of a single liquid lens in the arrangement shown made it possible to lower the value for the chromatic longitudinal aberration CHL to approximately 100 nm/pm. This shows in exemplary fashion the potential for full chromatization of such systems with the aid of one or more liquid lenses, as a result of which a significantly greater laser bandwidth acceptance can be achieved.

Numerous variants are possible within the scope of the invention. Provision may be made, for example, for increasing the dispersion of the water in a targeted manner by means of suitable additives that do not significantly impair the transmittance. This makes it possible to further increase the dispersion difference between the negative liquid lens and the adjacent positive lenses and thus to intensify the corrective effect. It is also possible to provide at least one second liquid lens, for example a further negative lens, which may be arranged in the biconcave lens interspaces on the object side or on the image side of the liquid lens group 150 in the region of relatively high marginal ray heights.

The achromatization can be assisted by lenses in the intermediate mirror region 125. By way of example, a lens utilized in triple passage may be provided in this region. By way of example, a negative lens may be provided before at least one of the concave mirrors. It is also possible to construct one or both mirrors as a Mangin mirror, that is to say as a rear surface concave mirror in which the mirror surface is formed by a mirror layer at a convexly curved surface of a negative lens.

Figure 4:
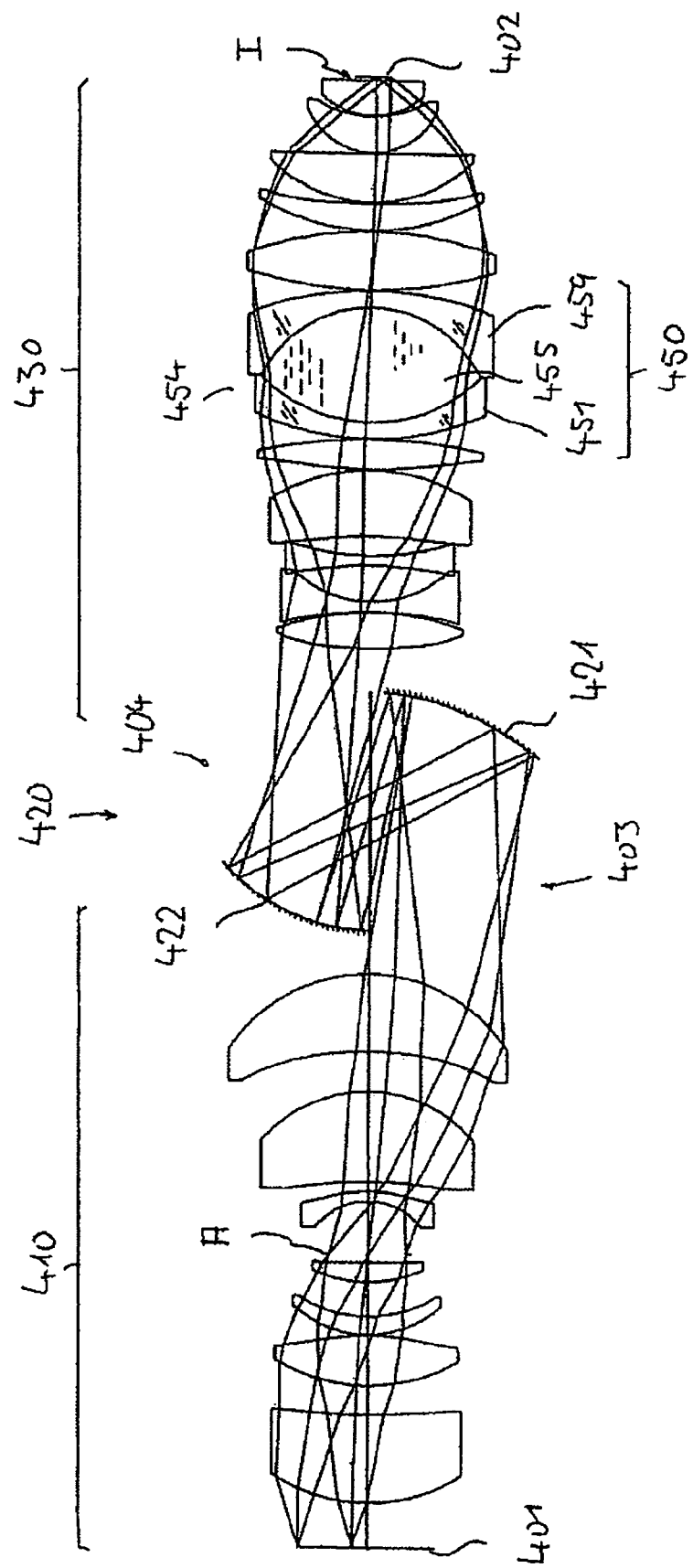
FIG. 4 shows a lens section through an embodiment of an optical system according to the invention which is designed as a catadioptric projection objective for microlithography at 157 nm.

FIG. 4 shows an exemplary embodiment of a catadioptric projection objective 400 designed for an operating wavelength of 157 nm. The basic construction (dioptric first subsystem, catoptric second subsystem with two concave mirrors, dioptric third subsystem, two intermediate images geometrically between the concave mirrors) corresponds to the embodiments explained above, for which reason reference is made to the explanation thereof. One difference is that all lenses of this system are produced from calcium fluoride. This material has a dispersion $D_{CaF2} \approx 0.0226/\text{nm}$ at 157 nm. The specification of the design is given in Tables 4 and 4A (aspheric data).

A non-achromatized system having the basic construction shown has a chromatic longitudinal aberration CHL of approximately 500 nm/pm. In order to improve the color correction, a liquid lens group 450 is provided in the third objective part 430 in the region of large marginal ray heights, said liquid lens group comprising, as delimiting elements, on the object side, a negative meniscus lens 451 that is concave toward the image and, on the image side, a negative meniscus lens 459 that is concave on the object side. During operation of the immersion objective, a liquid lens 455 having positive refractive power is provided in the biconvex interspace 454 delimited by the lenses 451, 459. The liquid is a liquid perfluoropolyether (PFPE), which is also used as an immersion liquid I between objective exit and image plane 402. A liquid known by the brand name Fomblin® is utilized here, which has, at 157 nm, a refractive index $n \approx 1.372$ and a dispersion $D_L \approx 0.0119/\text{nm}$. This value is produced as an estimated value from published data. What is important for the function as correction means is that the liquid 455 has a lower chromatic correction than calcium fluoride ($D_{CaF2} \approx 0.002259/\text{nm}$). On the basis of the principles explained above, within a positive/negative group, the medium having the lower dispersion is used in the positive lens (liquid lens), while the more greatly dispersive medium (calcium fluoride) forms the adjacent negative lenses. The chromatic longitudinal aberration CHL of this exemplary embodiment is approximately 300 nm/pm. This is a significantly improved value compared with an otherwise largely structurally identical, but non-achromatized design having a corresponding value of approximately 500 nm/pm.

In the selection of the materials for the transparent optical elements exhibiting refractive power, it is necessary to take account not only of dispersion and refractive index, but also of transmission and/or absorption. It may therefore be necessary for practical reasons to limit the axial extent of liquid lenses made of not completely transparent liquids to smaller values than the values shown by way of example.

Figure 5:
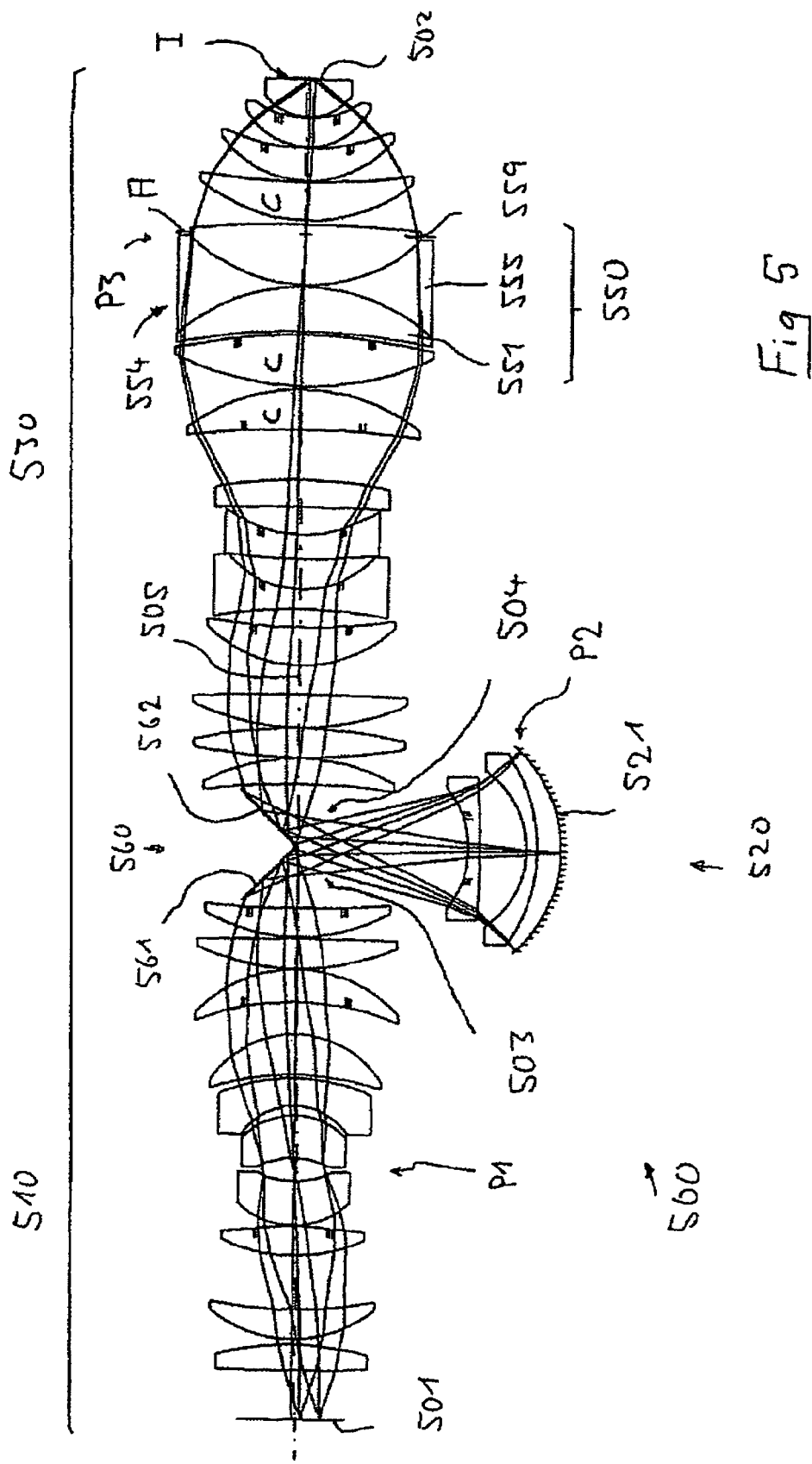
FIG. 5 shows a lens section through an embodiment of an optical system according to the invention which is designed as a catadioptric projection objective for microlithography at 193 nm, has a first refractive objective part, a second catadioptric objective part with a single concave mirror, and a third refractive objective part and also a geometric beam splitter with two planar folding mirrors, and has exclusively quartz glass lenses.

It will be explained by way of example with reference to FIG. 5 that the invention can also be advantageously utilized in the case of high-aperture projection objectives having a different construction. FIG. 5 shows a catadioptric projection objective 500 designed as an immersion objective for an operating wavelength of 193 nm. It is provided for imaging a pattern of a mask arranged in its object plane 501 onto its image plane 502 oriented parallel to the object plane, on a reduced scale, for example on a scale of 4:1. In this case, precisely two real intermediate images 503, 504 are generated between object plane and image plane. A first, purely refractive (dioptric) objective part 510 is designed in such a way that the pattern of the object plane is imaged into the first intermediate image 503 essentially without any change in size, on an imaging scale of approximately 1:−0.9. A second, catadioptric objective part 520 images the first intermediate image 503 onto the second intermediate image 504 essentially without any change in size (imaging scale approximately 1:−0.95). A third, purely refractive objective part 530 is designed for imaging the second intermediate image into the image plane 502 with a high degree of demagnification. In this case, operation of the projection objective involves radiating through a thin layer of an immersion liquid I situated between the exit surface of the projection objective and the image plane 502.

Immersion objectives having a comparable basic construction are shown in the international patent application WO 2004/019128 A2.

The catadioptric second objective part 520 contains the single concave mirror 421 of the projection objective. A geometric beam splitter 560 serves for separating the beam bundle running from the object plane 501 to the concave mirror 521 from that beam bundle which, after reflection at the concave mirror, runs between the latter and the image plane 502. For this purpose, the beam splitter 560 has a planar first folding mirror 561 for reflecting the radiation coming from the object plane to the concave mirror, and a second folding mirror 562, which is oriented at right angles to the first folding mirror 561 and deflects the radiation reflected from the concave mirror in the direction of the image plane. The intermediate images 503, 504 in each case lie in the vicinity of the folding mirrors 561, 562 but are at an optical minimum distance from the latter, so that possible defects on the mirror surfaces are not imaged sharply into the image plane and the plane mirrors 561, 562 lie in the region of moderate radiation energy density.

Pupil surfaces P1, P2, P3 of the imaging system lie between the object plane and the first intermediate image, between the first and second intermediate images, and also between the second intermediate image and the image plane, in each case where the principal ray of the optical imaging intersects the optical axis 505. The aperture diaphragm A of the system is fitted in the region of the pupil surface P3 of the third objective part 530. The pupil surface P2 within the catadioptric second objective part lies in direct proximity to the concave mirror 521.

The specification of this optical system is given in Tables 5 and 5A (aspheric data). All lenses of the projection objective consist of synthetic quartz glass. The system has an image-side numerical aperture NA=1.25.

A special feature of the system consists in the fact that a liquid lens group 550 is arranged in the region of large marginal ray heights in direct proximity to the pupil surface P3 of the third objective part 530 directly before the aperture diaphragm A, that is to say without an intervening lens. Said liquid lens group comprises a positive meniscus lens 551 with a concave surface on the object side as first, object-side delimiting optical element and a biconvex positive lens 559 as second image-side delimiting optical element. The mutually facing spherical convex surfaces of the delimiting optical elements 551, 559 delimit a biconcave interspace 554 in the axial direction, said interspace being delimited in the radial direction by a liquidtight lens holder for forming a fluid chamber. During operation of the projection objective, the interspace is filled with ultrapure water, which thereby forms a biconcave liquid lens 555. Since the two positive lenses 551 and 559 enclosing the liquid lens 555 consist of synthetic quartz glass which is resistant to the water of the liquid lens 555, the convex interfaces facing the liquid can be uncoated, which reduces the production outlay for these lenses. On account of the small difference in refractive index between water and synthetic quartz glass, the reflection losses at the solid/liquid interfaces are low, so that an antireflection coating can be dispensed with. However, it is possible to provide such a coating, which, if appropriate, may be produced from one or more dielectric materials that are chemically resistant to the liquid of the lens 555.

As already explained using the example of FIG. 1, the liquid lens group 550 has an advantageous effect on the correction of the chromatic longitudinal aberration (CHL). Reference is made to the above explanation of the effect. The improved color correction in the case of the present design type becomes clear from the following comparison. A projection objective which, with regard to the optical construction of the lenses, is practically identical to the embodiment shown in FIG. 5 but does not contain a liquid lens 555 had a chromatic longitudinal aberration CHL of approximately 100 nm/pm. By inserting the biconcave water lens 555 into the space directly before the aperture diaphragm A, it was possible to halve the chromatic longitudinal aberration to approximately 50 nm/pm in the case of the embodiment shown in FIG. 5.

The specification of a further exemplary embodiment (not illustrated pictorially) is given in Tables 6, 6A (aspheric data). In this case, the only difference with respect to the embodiment shown in FIG. 5 is that individual positive lenses in the aperture convexity of the third objective part 550 were replaced by lenses made of calcium fluoride and having substantially identical dimensions. The lenses 551, 559 surrounding the liquid lens 555 are still quartz glass lenses, however, in order to avoid the protective layer problem explained above. The positive lenses, which consist of calcium fluoride in the case of the embodiment not shown, are the two positive lenses arranged directly before the liquid lens group 550 and the positive lens arranged directly after the liquid lens group. These lenses are identified by "C" in FIG. 5. By introducing a third optical material in addition to the synthetic quartz glass and the water of the biconcave liquid lens 555, it is possible to provide a fully achromatized design having a chromatic longitudinal aberration CHL=0 nm/pm.

Figure 6:
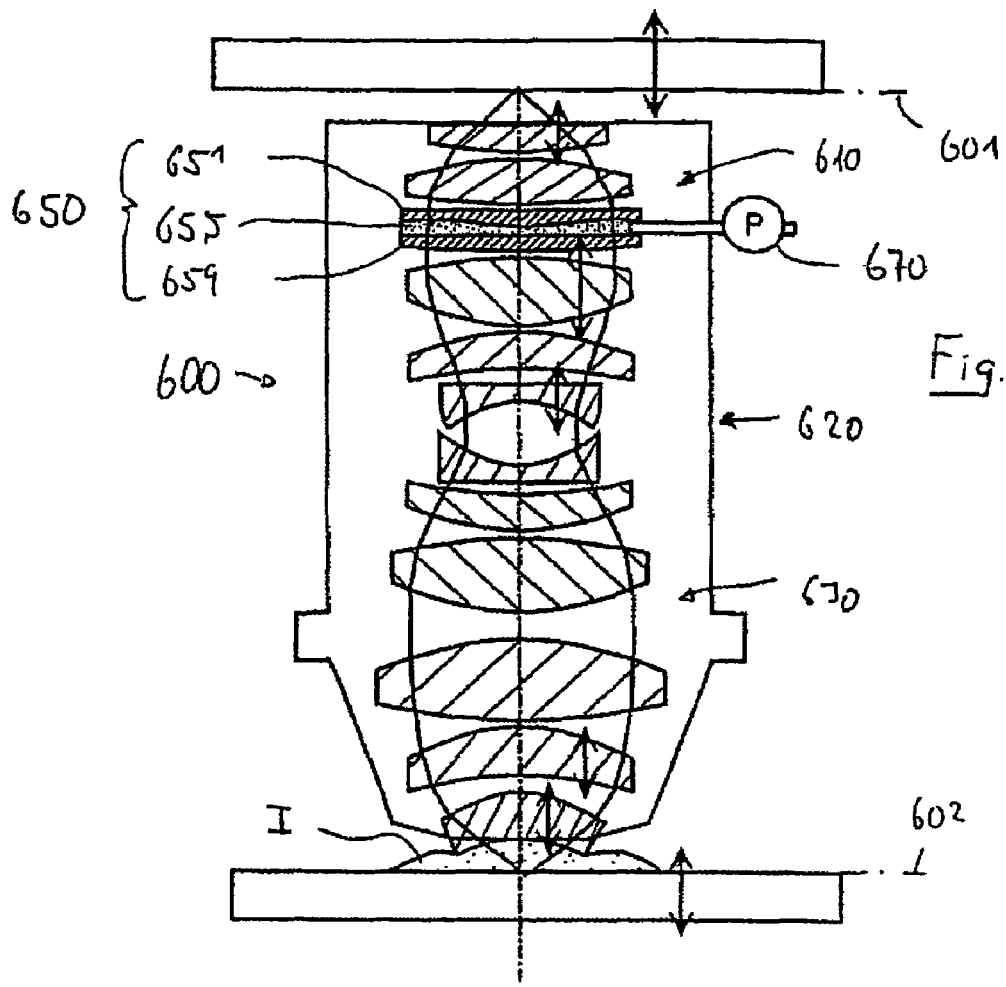
FIG. 6 shows a schematic illustration of a projection objective in which a liquid lens group is used as a hydraulically actuable manipulator for dynamically influencing the imaging properties.

FIG. 6 shows an embodiment of an optical system 600 in the form of a refractive projection objective for immersion lithography. It serves for imaging a pattern of a reticle present in the object plane 601 onto a light-sensitive substrate in the image plane 602 without the generation of an intermediate image with the aid of an immersion liquid I arranged between the exit of the projection objective and the image plane 602. The projection objective is incorporated into a projection exposure apparatus which permits slight manipulations of the axial position of object (mask) and substrate (wafer) (see double arrows). The projection objective itself contains a plurality of manipulators which make it possible to adjust the position of individual lenses and i.e. the axial position thereof and/or the centering thereof and/or the tilting position thereof without demounting the projection objective by activation of the manipulators (see double arrows). A so-called "two-convexity system" is involved, in which a "waist" 620 is formed between an object-side convexity 610 and an image-side convexity 630, the beam bundle diameter having its narrowest constriction in the region of said waist. Two-convexity systems for immersion lithography at 193 nm are known inter alia from the applicant's patent application WO 03/075049 A2.

A special feature of the system consists in the fact that the projection objective contains a liquid lens group 650, which in this example is arranged in the region of the largest beam diameter of the first convexity 610. In general, the liquid lens group can be fitted at any other location of the projection objective. The liquid lens group comprises an image-side, first delimiting element 651, an object-side, second delimiting optical element 659 and a liquid lens 655 arranged between these elements. In this connection, the term "liquid lens" is intended generally to denote a transparent optical element formed by a liquid and having an entry surface and exit surface, the entry surface and/or the exit surface generally being curved, but they may also be essentially planar. A pressure generating device 670 is connected to the interspace connected in liquidtight fashion along its periphery, the liquid lens 655 being situated in said interspace, which pressure generating device is designed for increasing the liquid pressure of the liquid, according to control signals of a control unit, beyond the ambient pressure of the liquid lens group in a targeted manner in order, in this way, to provide a hydraulically actuable manipulator which can be radiated through and by means of which the imaging performance of the projection objective can be varied dynamically within certain limits governed by the construction of the manipulator.

Figure 7:
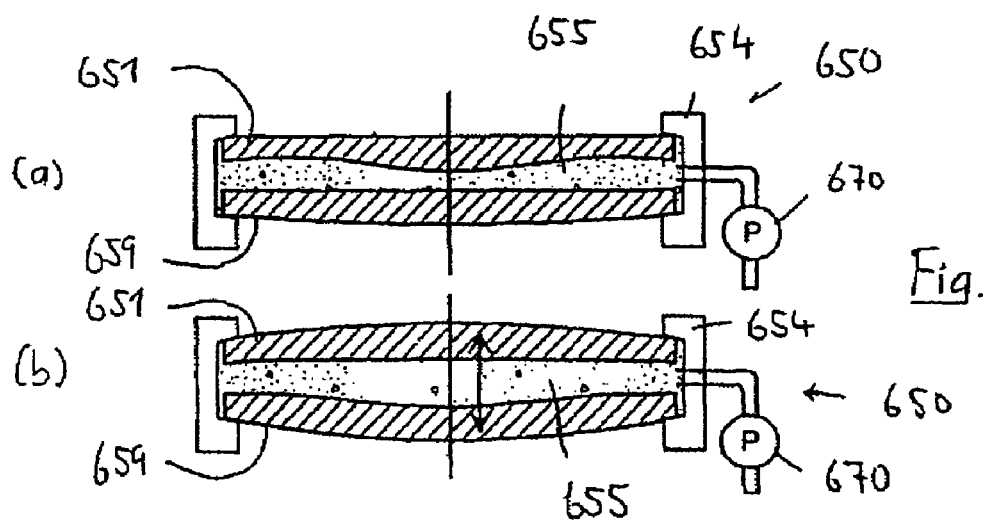
FIG. 7 shows detail views of the liquid lens group from FIG. 6 at different liquid pressures.

The construction and function of the hydraulically actuable manipulator will be explained in greater detail with reference to FIG. 7. The delimiting element 651 on the entry side has the form of a Schmidt correction plate having a spherically corrective effect and having a planar entry side on the object side and an aspheric exit side which is curved in the shape of a hat brim and faces the liquid lens. In the unloaded state, the exit-side delimiting element 659 arranged at an axial distance behind it has the form of a planoconvex lens having a planar entry surface adjacent to the liquid and a weakly convexly curved exit surface. The thin delimiting elements 651, 659 are held in a common liquidtight holder 654 that engages around the elements at their edge in the axial direction. The thickness of the elements 651, 659 is designed such that the elements are elastically deformable with the aid of pressure changes in the liquid, in order to be brought from the neutral position shown in FIG. 7(a) into a correction position shown by way of example in FIG. 7(b).

On account of the particular shaping of the delimiting elements 651, 659, the liquid lens group, in the neutral position, essentially has the optical effect of a plane-parallel plate which, on account of its orientation perpendicular to the optical axis and on account of its positioning in the region of small ray angles of the first convexity, has a largely neutral effect optically or has no refractive power. If the liquid pressure in the liquid lens 655 is then increased with the aid of the pressure generating device 670, the two thin delimiting elements 651, 659 are forced apart from one another under elastic deformation primarily in the central region of the arrangement, thus giving rise to a lens arrangement having overall a positive refractive power. By this means it is possible, if appropriate, to correct aberrations that may arise elsewhere in the projection objective on account of different ambient influences during the operation of the projection objective. Through dynamic driving of the liquid lens group with the aid of the pressure generating device, it is possible to optimize the imaging quality of the projection objective in situ, that is to say during the operation of the projection exposure apparatus. In particular, the pressure manipulator can be used to manipulate the Petzval sum.

Numerous variations of the construction and use of a hydraulically operable manipulator are possible within the scope of the invention. By way of example, the surfaces of the two thin delimiting elements need not be spherical or planar, rather they may also be formed as aspheric optical surfaces, in order to achieve a specific desired form in the case of a pressure variation. Favorable starting forms and end forms can be calculated by means of a finite element calculation. It may also suffice for only one of the delimiting optical elements to be elastically deformable by means of a pressure change and for the other to be substantially rigid, e.g. on account of a large thickness. The principle disclosed in FIGS. 6 and 7 on the basis of a refractive system can also be applied to other optical systems, in particular also to catadioptric projection objectives for microlithography. In particular, the systems with two concave mirrors as shown by way of example with reference to FIGS. 1 to 5 may be equipped with one or a plurality of such manipulators.

The liquid pressure in the interior of the liquid lens group serving as a manipulator may already be increased relative to the ambient pressure in the neutral position of the pressure manipulator, that is to say for the initial system. It is thereby possible to use the manipulator more effectively in two adjusting directions without having to generate a negative pressure relative to the environment in the interspace between the delimiting elements. The operating point of the manipulator can thus be moved in such a way that an excess pressure relative to the environment always exists in the interior of the manipulator.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

TABLE 1

(J245)

| SURF | RADIUS | THICK-NESS | MATE-RIAL | INDEX | SEMIDIAM. |
|---|---|---|---|---|---|
| 0 | 0.0000 | 40.0000 | AIR | | 66.0 |
| *1 | 134.3027 | 30.0635 | SILUV | 1.560383 | 88.1 |
| 2 | 418.6097 | 93.3270 | AIR | | 87.3 |
| 3 | 129.1805 | 60.9961 | SILUV | 1.560383 | 85.3 |
| *4 | −345.5214 | 0.9493 | AIR | | 77.2 |
| 5 | 84.7757 | 21.7256 | SILUV | 1.560383 | 63.6 |
| 6 | 80.9267 | 18.6625 | AIR | | 54.6 |

TABLE 1-continued (J245)

| SURF | RADIUS | THICK-NESS | MATE-RIAL | INDEX | SEMIDIAM. |
|---|---|---|---|---|---|
| 7 | 120.8142 | 18.8396 | SILUV | 1.560383 | 50.2 |
| *8 | 1504.8724 | 8.4094 | AIR | | 45.8 |
| 9 | 0.0000 | 52.4643 | AIR | | 39.6 |
| 10 | −63.9788 | 9.0145 | SILUV | 1.560383 | 48.4 |
| *11 | −222.2405 | 2.3872 | AIR | | 62.0 |
| 12 | −542.3504 | 27.6468 | SILUV | 1.560383 | 66.2 |
| 13 | −122.8633 | 43.1474 | AIR | | 71.2 |
| *14 | −239.9718 | 41.7833 | SILUV | 1.560383 | 92.6 |
| 15 | −114.9842 | 276.2627 | AIR | | 96.9 |
| *16 | −221.3623 | −236.2631 | REFL | | 160.0 |
| *17 | 171.8588 | 276.2627 | REFL | | 112.9 |
| *18 | 249.0870 | 47.9283 | SILUV | 1.560383 | 100.5 |
| 19 | −303.3025 | 9.4338 | AIR | | 99.4 |
| 20 | −2981.1064 | 8.9998 | SILUV | 1.560383 | 88.5 |
| 21 | 104.0187 | 56.0955 | AIR | | 77.1 |
| 22 | −287.7370 | 24.9420 | SILUV | 1.560383 | 79.3 |
| 23 | 308.4923 | 30.3524 | AIR | | 91.0 |
| 24 | −324.5756 | 42.9365 | CAFUV | 1.501041 | 93.1 |
| 25 | −139.8662 | 0.9498 | AIR | | 100.6 |
| *26 | 343.9336 | 40.5250 | CAFUV | 1.501041 | 121.4 |
| 27 | −463.8981 | 0.9499 | AIR | | 122.9 |
| 28 | 298.3321 | 66.1491 | CAFUV | 1.501041 | 129.0 |
| 29 | −310.4199 | 8.9999 | H2O | 1.436677 | 128.4 |
| 30 | 199.9874 | 66.5291 | CAFUV | 1.501041 | 121.1 |
| *31 | −867.5707 | 0.9498 | AIR | | 119.0 |
| 32 | 624.9671 | 31.4972 | CAFUV | 1.501041 | 115.5 |
| 33 | −562.1606 | 0.9492 | AIR | | 114.2 |
| 34 | 220.6359 | 27.4642 | CAFUV | 1.501041 | 101.8 |
| *35 | 1486.5766 | 0.9488 | AIR | | 98.4 |
| 36 | 146.4748 | 29.8665 | CAFUV | 1.501041 | 86.9 |
| *37 | 409.5855 | 0.9483 | AIR | | 81.8 |
| 38 | 68.3427 | 33.1394 | SILUV | 1.560383 | 59.5 |
| 39 | 122.9014 | 0.9403 | AIR | | 50.0 |
| 40 | 67.2372 | 29.8267 | CAFUV | 1.501041 | 41.6 |
| 41 | 0.0000 | 3.0000 | H2O | 1.436677 | 21.1 |
| 42 | 0.0000 | 0.0000 | AIR | 0.000000 | 16.5 |

TABLE 1A (ASPHERIC CONSTANTS)

| | SRF | | | | |
|---|---|---|---|---|---|
| | 1 | 4 | 8 | 11 | 14 |
| K | 0 | 0 | 0 | 0 | 0 |
| C1 | −3.606744E−08 | 1.902710E−07 | 1.301073E−07 | 1.743423E−07 | −1.598312E−08 |
| C2 | −2.596228E−13 | 8.162094E−12 | −3.143603E−11 | −1.937592E−12 | −1.068383E−12 |
| C3 | −5.158171E−17 | −2.363052E−15 | 1.212511E−15 | 8.423857E−16 | 2.383757E−18 |
| C4 | −9.439665E−21 | 2.412174E−19 | −3.100004E−19 | 2.707503E−20 | 6.673545E−22 |
| C5 | 6.671085E−25 | −1.211457E−23 | 2.322507E−21 | −9.430000E−24 | 1.101307E−25 |
| C6 | −3.597727E−29 | 5.994983E−29 | −5.146985E−25 | −4.849904E−28 | −4.028332E−30 |

| | SRF | | | | |
|---|---|---|---|---|---|
| | 16 | 17 | 18 | 26 | 31 |
| K | 0 | 0 | 0 | 0 | 0 |
| C1 | 6.334769E−09 | −8.369749E−09 | 6.383132E−10 | −3.426377E−08 | −3.544010E−09 |
| C2 | 1.047800E−13 | −2.233593E−13 | 1.687250E−12 | 1.380271E−13 | 3.912315E−13 |
| C3 | 8.386696E−19 | −1.053589E−18 | −3.223001E−20 | 1.219425E−19 | −8.466436E−18 |
| C4 | 7.404964E−23 | −9.915536E−22 | −1.478365E−20 | −1.870323E−22 | 7.123381E−22 |
| C5 | −2.964795E−27 | 9.897189E−26 | 8.960224E−25 | 4.146350E−27 | −5.089403E−26 |
| C6 | 1.254039E−31 | −7.249974E−30 | −1.957420E−29 | −7.505294E−31 | 1.095902E−30 |
| C7 | −2.449615E−36 | 2.540950E−34 | | | |
| C8 | 2.694931E−41 | −3.824845E−39 | | | |

TABLE 1A-continued (ASPHERIC CONSTANTS)

| | SRF | |
|---|---|---|
| | 35 | 37 |
| K | 0 | 0 |
| C1 | 5.270098E−08 | −8.005389E−08 |
| C2 | −2.075855E−12 | 1.497826E−11 |
| C3 | 3.782481E−17 | −1.127795E−15 |
| C4 | −9.557304E−21 | 8.606401E−20 |
| C5 | 9.583017E−25 | −4.816218E−24 |
| C6 | −2.323388E−29 | 1.334067E−28 |

TABLE 2

(J242)

| SURF | RADIUS | THICKNESS | MATERIAL | INDEX | SEMIDIAM. |
|---|---|---|---|---|---|
| 0 | 0.0000 | 40.0000 | | | 66.0 |
| *1 | 131.2864 | 31.0366 | SILUV | 1.560383 | 88.4 |
| 2 | 419.2023 | 103.6452 | | | 87.5 |
| 3 | 117.1823 | 49.6866 | SILUV | 1.560383 | 83.7 |
| *4 | −484.2040 | 7.7588 | | | 78.4 |
| 5 | 74.6046 | 18.2106 | SILUV | 1.560383 | 60.6 |
| 6 | 69.5529 | 16.4162 | | | 52.5 |
| 7 | 128.4206 | 18.2850 | SILUV | 1.560383 | 50.9 |
| *8 | 952.9499 | 8.0785 | | | 46.4 |
| 9 | 0.0000 | 50.1424 | | | 40.3 |
| 10 | −61.4197 | 8.9994 | SILUV | 1.560383 | 47.9 |
| *11 | −188.1856 | 0.9489 | | | 61.3 |
| 12 | −776.4222 | 20.8300 | SILUV | 1.560383 | 66.6 |
| 13 | −179.3620 | 32.0067 | | | 71.1 |
| *14 | −444.1742 | 47.7017 | SILUV | 1.560383 | 89.7 |
| 15 | −112.0874 | 276.1645 | | | 93.9 |
| *16 | −207.7687 | −236.1657 | REFL | | 155.0 |
| *17 | 179.8155 | 276.1800 | REFL | | 121.0 |
| *18 | 333.4113 | 38.0219 | SILUV | 1.560383 | 94.6 |
| 19 | −303.8657 | 6.7944 | | | 93.7 |
| 20 | 738.6131 | 8.9997 | SILUV | 1.560383 | 83.6 |
| 21 | 96.1054 | 52.5707 | | | 73.0 |
| 22 | −303.4105 | 14.3826 | SILUV | 1.560383 | 74.8 |
| 23 | 343.7745 | 37.7439 | | | 81.9 |
| 24 | −157.3200 | 25.9150 | SILUV | 1.560383 | 83.9 |
| 25 | −117.1130 | 2.8949 | | | 89.1 |
| *26 | 325.5566 | 34.5583 | SILUV | 1.560383 | 107.2 |
| 27 | −429.3324 | 0.9495 | | | 108.7 |
| 28 | 299.9953 | 46.9495 | SILUV | 1.560383 | 112.7 |
| 29 | −401.4227 | 26.4522 | | | 112.1 |
| 30 | −176.5388 | 13.7790 | SILUV | 1.560383 | 111.2 |
| *31 | −376.7524 | 0.9493 | | | 115.3 |
| 32 | 844.4501 | 44.2493 | SILUV | 1.560383 | 115.1 |
| 33 | −253.6278 | 0.9481 | | | 114.6 |
| 34 | 224.9667 | 23.3947 | SILUV | 1.560383 | 98.5 |
| *35 | 744.1399 | 0.9476 | | | 95.4 |
| 36 | 134.3960 | 32.9913 | SILUV | 1.560383 | 85.5 |
| *37 | 585.4854 | 0.9472 | | | 80.6 |
| 38 | 65.4730 | 33.0067 | SILUV | 1.560383 | 57.8 |
| 39 | 113.4738 | 1.1170 | | | 48.2 |
| 40 | 64.8356 | 28.5127 | CAFUV | 1.501041 | 40.3 |
| 41 | 0.0000 | 3.0000 | H2O | 1.436677 | 21.1 |
| 42 | 0.0000 | 0.0000 | AIR | | 16.5 |

TABLE 2A (ASPHERIC CONSTANTS)

| | SRF | | | | |
|---|---|---|---|---|---|
| | 1 | 4 | 8 | 11 | 14 |
| K | 0 | 0 | 0 | 0 | 0 |
| C1 | −3.796259E−08 | 1.817213E−07 | 5.511404E−08 | 1.320523E−07 | −4.088301E−08 |
| C2 | −1.784453E−13 | 7.818928E−12 | −3.176601E−11 | −2.597233E−12 | −1.116219E−12 |
| C3 | −1.146392E−16 | −2.234966E−15 | 1.635892E−15 | 1.511883E−15 | 5.018490E−17 |
| C4 | −7.581413E−21 | 2.248142E−19 | −1.255364E−19 | 2.013209E−20 | −2.388629E−21 |
| C5 | 8.496363E−25 | −1.157035E−23 | 2.332937E−21 | −9.685690E−24 | 1.947929E−25 |
| C6 | −5.270874E−29 | 6.737631E−29 | −5.158512E−25 | −1.188054E−27 | −1.138695E−29 |

| | SRF | | | | |
|---|---|---|---|---|---|
| | 16 | 17 | 18 | 26 | 31 |
| K | 0 | 0 | 0 | 0 | 0 |
| C1 | 7.822491E−09 | −6.521928E−09 | −1.048584E−08 | −5.452180E−08 | −2.635518E−08 |
| C2 | 1.456059E−13 | −1.587682E−13 | 2.592265E−12 | 5.747925E−13 | 1.430722E−12 |
| C3 | 2.225750E−18 | −2.690193E−18 | 9.726564E−18 | −8.623611E−18 | −5.310153E−17 |
| C4 | 4.076960E−23 | −2.588291E−22 | −1.752415E−20 | −5.397125E−22 | 1.890512E−21 |
| C5 | 1.693114E−28 | 1.660727E−26 | 1.046798E−24 | 5.509894E−26 | −6.428060E−26 |
| C6 | 3.563927E−32 | −1.309475E−30 | −2.734676E−29 | −4.323187E−30 | 1.416350E−30 |

TABLE 2A-continued

(ASPHERIC CONSTANTS)

| | | |
|---|---|---|
| C7 | −6.931624E−37 | 4.332865E−35 |
| C8 | 2.466968E−41 | −7.748180E−40 |

| | SRF | |
|---|---|---|
| | 35 | 37 |
| K | 0 | 0 |
| C1 | 3.938815E−08 | −1.532803E−08 |
| C2 | −6.492688E−13 | 9.544697E−12 |
| C3 | −1.930634E−16 | −6.232078E−16 |
| C4 | 1.144601E−20 | 3.358555E−20 |
| C5 | 1.320971E−25 | −1.628902E−24 |
| C6 | −1.238821E−29 | 5.262616E−29 |

TABLE 3A

(J244)

| SURF | RADIUS | THICKNESS | MATERIAL | INDEX | SEMIDIAM. |
|---|---|---|---|---|---|
| 0 | 0.0000 | 40.0000 | AIR | | 66.0 |
| *1 | 131.9336 | 29.9263 | SILUV | 1.560383 | 88.3 |
| 2 | 382.8887 | 95.2012 | AIR | | 87.5 |
| 3 | 127.6451 | 55.0037 | SILUV | 1.560383 | 85.6 |
| *4 | −322.1121 | 3.2318 | AIR | | 79.8 |
| 5 | 78.2509 | 23.0693 | SILUV | 1.560383 | 62.6 |
| 6 | 71.3047 | 15.1592 | AIR | | 52.3 |
| 7 | 116.6154 | 18.7595 | SILUV | 1.560383 | 50.3 |
| *8 | 680.5886 | 9.8304 | AIR | | 45.6 |
| 9 | 0.0000 | 45.4557 | AIR | | 38.3 |
| 10 | −59.2198 | 8.9984 | SILUV | 1.560383 | 45.8 |
| *11 | −229.5454 | 1.1979 | AIR | | 60.5 |
| 12 | −823.3195 | 26.3103 | SILUV | 1.560383 | 64.9 |
| 13 | −133.5972 | 41.8576 | AIR | | 70.1 |
| *14 | −389.4387 | 49.7506 | SILUV | 1.560383 | 95.3 |
| 15 | −116.6231 | 275.8455 | AIR | | 99.7 |
| *16 | −211.1601 | −235.8521 | REFL | | 155.8 |
| *17 | 183.3186 | 275.8509 | REFL | | 124.0 |
| *18 | 207.6426 | 50.9033 | SILUV | 1.560383 | 101.2 |
| 19 | −343.8726 | 3.0139 | AIR | | 99.7 |
| 20 | 1689.9026 | 8.9989 | SILUV | 1.560383 | 89.3 |
| 21 | 99.8404 | 56.2046 | AIR | | 75.6 |
| 22 | −163.7734 | 15.4116 | SILUV | 1.560383 | 75.8 |
| 23 | 378.3104 | 49.0818 | AIR | | 85.7 |
| 24 | −292.7396 | 41.3749 | CAFUV | 1.501041 | 98.4 |
| 25 | −132.9514 | 0.9454 | AIR | | 103.0 |
| *26 | 395.4712 | 40.2838 | CAFUV | 1.501041 | 116.3 |
| 27 | −348.8985 | 0.9382 | AIR | | 117.3 |
| 28 | 299.2019 | 55.4229 | CAFUV | 1.501041 | 117.1 |
| 29 | −308.7984 | 17.2114 | AIR | | 115.9 |
| 30 | −196.3638 | 8.9860 | SILUV | 1.560383 | 114.5 |
| 31 | 322.7928 | 0.9955 | AIR | | 116.1 |
| 32 | 301.5915 | 44.2890 | CAFUV | 1.501041 | 116.9 |
| *33 | −798.5456 | 0.9300 | AIR | | 117.2 |
| 34 | 403.1423 | 46.5722 | CAFUV | 1.501041 | 115.8 |
| 35 | −328.8197 | 0.9182 | AIR | | 114.6 |
| 36 | 201.6297 | 29.3196 | CAFUV | 1.501041 | 99.8 |
| *37 | 1340.8685 | 0.9252 | AIR | | 96.5 |
| 38 | 133.9861 | 31.9135 | CAFUV | 1.501041 | 84.6 |
| *39 | 452.9225 | 0.9359 | AIR | | 79.5 |
| 40 | 64.3236 | 32.2893 | SILUV | 1.560383 | 57.0 |
| 41 | 105.4132 | 0.9275 | AIR | | 47.2 |
| 42 | 63.2859 | 28.6137 | CAFUV | 1.501041 | 40.1 |
| 43 | 0.0000 | 3.0000 | H2O | 1.436677 | 21.1 |
| 44 | 0.0000 | 0.0000 | AIR | 0.000000 | 16.5 |

TABLE 3A

(ASPHERIC CONSTANTS)

| | SRF | | | | |
|---|---|---|---|---|---|
| | 1 | 4 | 8 | 11 | 14 |
| K | 0 | 0 | 0 | 0 | 0 |
| C1 | −3.804828E−08 | 1.650855E−07 | 5.861733E−08 | 1.798281E−07 | −3.805516E−08 |
| C2 | −2.192940E−13 | 9.665571E−12 | −3.220344E−11 | −2.303965E−12 | −7.730954E−13 |
| C3 | −6.319889E−17 | −2.352390E−15 | 2.297619E−15 | 1.713221E−15 | 6.135840E−18 |
| C4 | −1.360729E−20 | 2.362382E−19 | −2.831044E−19 | −7.402486E−20 | 1.600454E−21 |
| C5 | 1.247120E−24 | −1.314601E−23 | 2.318491E−21 | −1.978467E−23 | −4.122478E−26 |
| C6 | −6.676542E−29 | 2.506361E−28 | −5.152774E−25 | 3.272384E−28 | −2.203696E−30 |

| | SRF | | | | |
|---|---|---|---|---|---|
| | 16 | 17 | 18 | 26 | 33 |
| K | 0 | 0 | 0 | 0 | 0 |
| C1 | 8.335132E−09 | −6.441106E−09 | 4.445990E−09 | −3.831546E−08 | −2.058893E−08 |
| C2 | 1.386058E−13 | −1.532610E−13 | 9.822984E−13 | 2.946305E−13 | 9.436794E−13 |
| C3 | 2.467600E−18 | −2.451292E−19 | −1.951032E−18 | −4.575651E−18 | −2.689111E−17 |

TABLE 3A-continued (ASPHERIC CONSTANTS)

| | | | | | |
|---|---|---|---|---|---|
| C4 | −3.907848E−23 | −6.267529E−22 | −1.059266E−20 | −1.329477E−22 | 1.005837E−21 |
| C5 | 6.022209E−27 | 5.890403E−26 | 5.353361E−25 | 1.260211E−26 | −3.871975E−26 |
| C6 | −2.415195E−31 | −3.872141E−30 | −9.402015E−30 | −1.207883E−30 | 8.614639E−31 |
| C7 | 6.132500E−36 | 1.244238E−34 | | | |
| C8 | −4.935442E−41 | −1.704587E−39 | | | |

| | SRF | |
|---|---|---|
| | 37 | 39 |
| K | 0 | 0 |
| C1 | 4.919239E−08 | −5.309597E−08 |
| C2 | −2.160479E−12 | 1.396469E−11 |
| C3 | −3.035845E−18 | −1.294614E−15 |
| C4 | −1.172513E−21 | 1.170094E−19 |
| C5 | 3.473583E−25 | −7.330217E−24 |
| C6 | −9.632211E−30 | 2.369934E−28 |

TABLE 4

(J324)

| SURF | RADIUS | THICK-NESS | MATERIAL | INDEX | SEMI-DIAM. |
|---|---|---|---|---|---|
| 0 | 0.0000 | 40.0000 | | | 63.0 |
| *1 | 158.8249 | 81.1034 | CAFUV | 1.554124 | 82.9 |
| 2 | 802.4131 | 26.9327 | | | 80.4 |
| 3 | 170.5645 | 45.4588 | CAFUV | 1.554124 | 80.1 |
| *4 | −207.3819 | 0.9501 | | | 77.1 |
| 5 | 99.9407 | 16.5370 | CAFUV | 1.554124 | 64.0 |
| 6 | 119.9724 | 31.4118 | | | 59.2 |
| 7 | 119.4559 | 17.9001 | CAFUV | 1.554124 | 46.3 |
| *8 | 7551.0808 | 8.1814 | | | 42.0 |
| 9 | 0.0000 | 47.2475 | | | 35.4 |
| 10 | −62.3785 | 8.9998 | CAFUV | 1.554124 | 45.5 |
| *11 | −127.7820 | 9.0395 | | | 56.5 |
| 12 | −404.2998 | 82.7884 | CAFUV | 1.554124 | 67.7 |
| 13 | −127.4631 | 37.2183 | | | 93.9 |
| *14 | −322.1832 | 71.6833 | CAFUV | 1.554124 | 111.2 |
| 15 | −151.4625 | 259.1840 | | | 124.3 |
| *16 | −202.2541 | −219.1840 | REFL | | 151.9 |
| *17 | 171.5710 | 259.1840 | REFL | | 129.5 |
| *18 | 539.1414 | 32.5493 | CAFUV | 1.554124 | 81.3 |
| 19 | −258.9990 | 0.9478 | | | 79.8 |
| 20 | −339.4767 | 8.9985 | CAFUV | 1.554124 | 77.3 |
| 21 | 103.9932 | 33.5806 | | | 68.2 |
| 22 | −329.1103 | 8.9992 | CAFUV | 1.554124 | 68.3 |
| 23 | 250.8286 | 17.6685 | | | 72.8 |
| 24 | −456.2910 | 61.1243 | CAFUV | 1.554124 | 73.3 |
| 25 | −169.3306 | 0.9495 | | | 88.8 |
| *26 | 408.5521 | 27.5356 | CAFUV | 1.554124 | 97.4 |
| 27 | −480.8139 | 0.9497 | | | 98.5 |
| 28 | 265.5421 | 14.9999 | CAFUV | 1.554124 | 101.2 |
| 29 | 145.6151 | 104.0103 | FOMBLIN | 1.372000 | 98.1 |
| 30 | −113.1177 | 14.9998 | CAFUV | 1.554124 | 98.3 |
| *31 | −362.6805 | 0.9496 | | | 108.1 |
| 32 | 400.2679 | 52.6673 | CAFUV | 1.554124 | 109.8 |
| 33 | −334.1106 | 0.9470 | | | 108.8 |
| 34 | 204.0682 | 24.4482 | CAFUV | 1.554124 | 98.5 |
| *35 | 881.0350 | 0.9485 | | | 96.1 |
| 36 | 134.6665 | 44.4618 | CAFUV | 1.554124 | 89.9 |
| *37 | −3360.2216 | 0.9495 | | | 85.2 |
| 38 | 64.5162 | 32.8916 | CAFUV | 1.554124 | 57.7 |
| 39 | 98.9711 | 0.9461 | | | 47.6 |
| 40 | 68.4311 | 32.0708 | CAFUV | 1.554124 | 42.3 |
| 41 | 0.0000 | 3.0000 | FOMBLIN | 1.372000 | 21.2 |
| 42 | 0.0000 | 0.0000 | | 0.000000 | 15.8 |

TABLE 4A (ASPHERIC CONSTANTS)

| | SRF | | | | |
|---|---|---|---|---|---|
| | 1 | 4 | 8 | 11 | 14 |
| K | 0 | 0 | 0 | 0 | 0 |
| C1 | −6.763300E−09 | 1.351528E−07 | 1.110574E−07 | 2.355521E−07 | −2.360929E−08 |
| C2 | 5.215678E−13 | 6.269086E−12 | −1.362331E−11 | 2.546359E−11 | −6.401579E−13 |
| C3 | 9.118259E−19 | −1.313918E−15 | 8.737175E−16 | 1.792590E−15 | −4.301546E−18 |
| C4 | 1.590981E−21 | 1.608735E−19 | −3.037645E−19 | −1.931853E−20 | −9.485516E−22 |
| C5 | −6.092432E−25 | −1.132324E−23 | 2.313522E−21 | −3.354649E−23 | 5.202667E−26 |
| C6 | 2.313686E−29 | 3.380367E−28 | −5.177726E−25 | −6.226056E−28 | −2.046216E−30 |

| | SRF | | | | |
|---|---|---|---|---|---|
| | 16 | 17 | 18 | 26 | 31 |
| K | 0 | 0 | 0 | 0 | 0 |
| C1 | 1.321224E−08 | −5.913096E−09 | 9.587092E−08 | −3.087283E−08 | −1.527170E−08 |

TABLE 4A-continued (ASPHERIC CONSTANTS)

| | | | | | |
|---|---|---|---|---|---|
| C2 | 1.942633E−13 | −1.606096E−13 | 3.648169E−12 | −2.357081E−13 | −6.376831E−13 |
| C3 | 2.261650E−18 | −3.503213E−18 | −1.209244E−16 | −3.868782E−17 | −8.848097E−18 |
| C4 | 1.041946E−22 | −3.265221E−22 | −1.634338E−20 | −1.078957E−21 | −4.776384E−22 |
| C5 | −5.061727E−27 | 2.655828E−26 | −5.897849E−25 | −2.979336E−26 | 9.514092E−27 |
| C6 | 3.506718E−31 | −2.382803E−30 | 6.716280E−29 | −7.350661E−30 | 8.144442E−31 |
| C7 | −9.833744E−36 | 9.207690E−35 | | | |
| C8 | 1.454917E−40 | −1.827745E−39 | | | |

| | SRF | |
|---|---|---|
| | 35 | 37 |
| K | 0 | 0 |
| C1 | 5.670641E−08 | 9.797860E−09 |
| C2 | −1.190620E−14 | 3.822910E−12 |
| C3 | −1.890283E−17 | −4.376648E−16 |
| C4 | 1.182643E−22 | 4.503297E−20 |
| C5 | −7.545758E−27 | −2.647337E−24 |
| C6 | −9.926511E−30 | 8.703539E−29 |

TABLE 5

(J399)

| SURF | RADIUS | THICKNESS | MATERIAL | INDEX | SEMI-DIAM. |
|---|---|---|---|---|---|
| 0 | 0.0000 | 55.1219 | | | 61.0 |
| 1 | 2103.3748 | 28.5637 | SILUV | 1.560491 | 82.7 |
| 2 | −342.6550 | 6.6278 | | | 85.9 |
| 3 | 147.8324 | 32.2647 | SILUV | 1.560491 | 93.4 |
| 4 | 461.4131 | 60.5398 | | | 91.6 |
| 5 | 198.5509 | 32.4960 | SILUV | 1.560491 | 80.6 |
| *6 | −336.3036 | 1.1840 | | | 77.8 |
| 7 | 91.6362 | 49.9998 | SILUV | 1.560491 | 63.6 |
| 8 | 98.0084 | 25.9189 | | | 42.3 |
| 9 | −91.4318 | 47.9800 | SILUV | 1.560491 | 41.3 |
| 10 | −83.9751 | 10.6972 | | | 59.1 |
| 11 | −72.5797 | 31.1907 | SILUV | 1.560491 | 60.4 |
| 12 | −213.3317 | 4.2531 | | | 86.2 |
| 13 | −297.8204 | 44.5914 | SILUV | 1.560491 | 91.7 |
| 14 | −116.4890 | 35.7151 | | | 97.3 |
| *15 | −345.2249 | 35.7922 | SILUV | 1.560491 | 112.0 |
| 16 | −160.2594 | 0.9998 | | | 115.0 |
| 17 | 282.2416 | 33.3766 | SILUV | 1.560491 | 113.0 |
| 18 | −5337.8278 | 1.9533 | | | 111.5 |
| 19 | 212.7754 | 32.4276 | SILUV | 1.560491 | 104.9 |
| *20 | 2302.0907 | 69.9991 | | | 101.6 |
| 21 | 0.0000 | −194.2068 | REFL | | 188.4 |
| *22 | 97.1294 | −12.5000 | SILUV | 1.560491 | 69.1 |
| 23 | 1105.1518 | −52.6263 | | | 80.6 |
| 24 | 107.3841 | −12.5000 | SILUV | 1.560491 | 88.5 |
| 25 | 187.9809 | −26.7566 | | | 107.8 |
| 26 | 152.8160 | 26.7566 | REFL | | 116.2 |
| 27 | 187.9809 | 12.5000 | SILUV | 1.560491 | 107.8 |
| 28 | 107.3841 | 52.6263 | | | 88.5 |
| 29 | 1105.1518 | 12.5000 | SILUV | 1.560491 | 80.6 |
| *30 | 97.1294 | 194.2093 | | | 69.1 |
| 31 | 0.0000 | −69.9997 | REFL | | 204.2 |
| 32 | 807.1600 | −28.8960 | SILUV | 1.560491 | 105.0 |
| 33 | 232.0504 | −0.9997 | | | 108.5 |
| 34 | −662.4475 | −32.7272 | SILUV | 1.560491 | 118.5 |
| 35 | 538.2628 | −0.9997 | | | 119.5 |

TABLE 5-continued (J399)

| SURF | RADIUS | THICKNESS | MATERIAL | INDEX | SEMI-DIAM. |
|---|---|---|---|---|---|
| 36 | −291.6829 | −37.0507 | SILUV | 1.560491 | 121.7 |
| 37 | 2678.7338 | −32.2595 | | | 120.6 |
| 38 | −150.4171 | −43.5151 | SILUV | 1.560491 | 106.2 |
| *39 | −814.9520 | −20.8987 | | | 102.0 |
| 40 | 523.8544 | −22.2073 | SILUV | 1.560491 | 99.4 |
| *41 | −109.6640 | −34.5246 | | | 82.6 |
| 42 | −682.5908 | −27.5734 | SILUV | 1.560491 | 83.4 |
| *43 | −131.4312 | −32.2579 | | | 87.4 |
| 44 | 1910.1498 | −29.9684 | SILUV | 1.560491 | 90.0 |
| 45 | 528.9338 | −55.5687 | | | 99.0 |
| *46 | 1943.5745 | −44.6243 | SILUV | 1.560491 | 128.8 |
| 47 | 219.5263 | −3.5017 | | | 132.4 |
| 48 | −343.6972 | −57.4846 | SILUV | 1.560491 | 146.7 |
| *49 | 649.4527 | −3.6773 | | | 146.2 |
| 50 | 730.8193 | −50.4756 | SILUV | 1.560491 | 145.2 |
| 51 | 217.5477 | −2.0000 | H2O | 1.436823 | 144.6 |
| 52 | −188.9385 | −67.9597 | SILUV | 1.560491 | 131.4 |
| 53 | 1418.2753 | 11.1445 | | | 130.1 |
| 54 | 0.0000 | −15.9618 | | | 128.2 |
| 55 | −194.1975 | −42.2593 | SILUV | 1.560491 | 120.6 |
| 56 | −878.2301 | −0.9997 | | | 116.9 |
| 57 | −125.6595 | −36.1220 | SILUV | 1.560491 | 97.3 |
| *58 | −246.9270 | −0.9995 | | | 90.1 |
| 59 | −79.8087 | −32.2639 | SILUV | 1.560491 | 70.2 |
| *60 | −135.2424 | −1.0001 | | | 58.9 |
| 61 | −63.3289 | −41.3174 | SILUV | 1.560491 | 49.0 |
| 62 | 0.0000 | −1.0016 | H2O | 1.436823 | 20.0 |
| 63 | 0.0000 | 0.0000 | AIR | 0.000000 | 18.3 |

TABLE 5A (ASPHERIC CONSTANTS)

| | SRF | | | | |
|---|---|---|---|---|---|
| | 6 | 15 | 20 | 22 | 30 |
| K | 0 | 0 | 0 | 0 | 0 |
| C1 | 7.813382E−08 | −1.786462E−08 | 1.301224E−08 | −1.116044E−07 | −1.116044E−07 |
| C2 | 1.371652E−13 | 4.943375E−13 | 4.610839E−13 | −6.504693E−12 | −6.504693E−12 |
| C3 | 3.240267E−16 | −2.484645E−17 | −3.359377E−17 | −5.625456E−16 | −5.625456E−16 |
| C4 | −1.790059E−20 | 1.955779E−22 | 1.316017E−21 | −3.090392E−21 | −3.090392E−21 |
| C5 | 1.086132E−24 | 1.677037E−27 | −3.001398E−26 | −1.829909E−24 | −1.829909E−24 |
| C6 | −8.734682E−29 | −1.031212E−31 | 2.823700E−31 | −6.637584E−28 | −6.637584E−28 |

| | SRF | | | | |
|---|---|---|---|---|---|
| | 39 | 41 | 43 | 46 | 49 |
| K | 0 | 0 | 0 | 0 | 0 |
| C1 | −1.924983E−08 | −4.326390E−08 | 5.916621E−08 | 2.409751E−08 | 8.817388E−09 |
| C2 | 2.060331E−13 | 2.188690E−12 | 2.570133E−12 | −4.016570E−13 | −3.010459E−13 |
| C3 | 4.019247E−17 | −1.350968E−17 | 1.199930E−16 | −1.115962E−17 | −1.173620E−17 |
| C4 | −2.487049E−21 | 8.143371E−21 | 1.387850E−20 | −1.450014E−22 | 3.366857E−22 |
| C5 | 1.106174E−25 | 1.776516E−24 | −2.227730E−24 | −1.387513E−26 | −3.029394E−27 |
| C6 | 2.114600E−30 | −1.427600E−28 | 2.016596E−28 | 5.851608E−31 | −1.807563E−32 |

| | SRF | |
|---|---|---|
| | 58 | 60 |
| K | 0 | 0 |
| C1 | −5.660229E−09 | −1.612239E−07 |
| C2 | −7.860526E−13 | −3.022845E−11 |
| C3 | 2.553991E−16 | 3.443650E−15 |
| C4 | −5.728368E−20 | −7.279023E−19 |
| C5 | 4.319081E−24 | 3.453562E−23 |
| C6 | −1.413205E−28 | −8.779409E−28 |

TABLE 6

(J400)

| SURF | RADIUS | THICKNESS | MATERIAL | INDEX | SEMIDIAM. |
|---|---|---|---|---|---|
| 0 | 0.0000 | 56.0567 | | | 61.0 |
| 1 | 2233.3150 | 28.3182 | SILUV | 1.560491 | 83.0 |
| 2 | −334.2094 | 6.7751 | | | 86.1 |
| 3 | 147.7223 | 32.3914 | SILUV | 1.560491 | 93.6 |
| 4 | 461.2755 | 60.2838 | | | 91.8 |
| 5 | 200.7073 | 32.2824 | SILUV | 1.560491 | 80.6 |
| *6 | −336.7586 | 1.6949 | | | 77.8 |
| 7 | 91.3802 | 50.0002 | SILUV | 1.560491 | 63.4 |
| 8 | 99.3716 | 25.7339 | | | 42.1 |
| 9 | −91.5446 | 49.0767 | SILUV | 1.560491 | 41.4 |
| 10 | −84.6879 | 10.5521 | | | 59.5 |
| 11 | −73.5827 | 36.7645 | SILUV | 1.560491 | 60.8 |
| 12 | −237.0203 | 1.2603 | | | 89.6 |
| 13 | −312.3936 | 45.6059 | SILUV | 1.560491 | 92.8 |
| 14 | −117.6041 | 35.4030 | | | 98.4 |
| *15 | −366.7394 | 35.7122 | SILUV | 1.560491 | 113.0 |
| 16 | −165.0317 | 0.9993 | | | 115.8 |
| 17 | 282.1532 | 33.4097 | SILUV | 1.560491 | 113.8 |
| 18 | −7193.5235 | 2.9606 | | | 112.3 |
| 19 | 211.2405 | 32.6123 | SILUV | 1.560491 | 105.4 |
| *20 | 2052.9727 | 70.0000 | | | 102.1 |
| 21 | 0.0000 | −193.3289 | REFL | | 190.0 |
| *22 | 97.0380 | −12.5000 | SILUV | 1.560491 | 69.3 |
| 23 | 1140.2866 | −52.7314 | | | 80.1 |
| 24 | 107.5406 | −12.5000 | SILUV | 1.560491 | 87.8 |
| 25 | 187.8903 | −26.7529 | | | 106.7 |
| 26 | 152.6808 | 26.7529 | REFL | | 115.4 |
| 27 | 187.8903 | 12.5000 | SILUV | 1.560491 | 106.7 |
| 28 | 107.5406 | 52.7314 | | | 87.8 |
| 29 | 1140.2866 | 12.5000 | SILUV | 1.560491 | 80.1 |
| *30 | 97.0380 | 193.3310 | | | 69.3 |
| 31 | 0.0000 | −70.0000 | REFL | | 204.7 |
| 32 | 800.3429 | −29.0618 | SILUV | 1.560491 | 105.4 |
| 33 | 231.5211 | −0.9997 | | | 108.9 |
| 34 | −664.6674 | −32.9090 | SILUV | 1.560491 | 118.8 |
| 35 | 535.5982 | −0.9997 | | | 119.9 |
| 36 | −291.3120 | −37.2600 | SILUV | 1.560491 | 121.9 |
| 37 | 2618.7337 | −33.0847 | | | 120.7 |
| 38 | −150.8637 | −43.1749 | SILUV | 1.560491 | 105.8 |
| *39 | −843.4695 | −20.3352 | | | 101.6 |
| 40 | 531.1909 | −22.3921 | SILUV | 1.560491 | 99.1 |
| *41 | −108.7627 | −35.3476 | | | 82.2 |
| 42 | −727.0974 | −22.3622 | SILUV | 1.560491 | 83.1 |
| *43 | −131.9017 | −33.9731 | | | 86.8 |
| 44 | 1637.7395 | −29.7993 | SILUV | 1.560491 | 90.5 |
| 45 | 538.2199 | −50.2244 | | | 99.7 |
| *46 | 2203.4622 | −47.1564 | CAFUV | 1.501106 | 126.8 |
| 47 | 204.3397 | −5.8469 | | | 130.5 |
| 48 | −327.2390 | −59.2602 | CAFUV | 1.501106 | 147.1 |
| *49 | 650.4154 | −4.7141 | | | 146.6 |
| 50 | 1000.7283 | −48.9040 | SILUV | 1.560491 | 145.1 |
| 51 | 236.7857 | −2.0000 | H2O | 1.436823 | 144.7 |
| 52 | −203.6742 | −68.5499 | SILUV | 1.560491 | 133.8 |
| 53 | 931.4014 | 10.6747 | | | 132.2 |
| 54 | 0.0000 | −12.6822 | | | 129.5 |
| 55 | −181.7350 | −47.1345 | CAFUV | 1.501106 | 121.5 |
| 56 | −962.9739 | −0.9998 | | | 117.6 |
| 57 | −127.0437 | −35.4940 | SILUV | 1.560491 | 97.5 |
| *58 | −249.7832 | −0.9996 | | | 90.2 |
| 59 | −79.7364 | −32.3659 | SILUV | 1.560491 | 70.2 |

TABLE 6-continued (J400)

| SURF | RADIUS | THICK-NESS | MATE-RIAL | INDEX | SEMIDIAM. |
|---|---|---|---|---|---|
| *60 | −134.6332 | −1.0046 | | | 58.9 |
| 61 | −63.8483 | −41.2964 | SILUV | 1.560491 | 49.1 |
| 62 | 0.0000 | −1.0016 | H2O | 1.436823 | 20.0 |
| 63 | 0.0000 | 0.0000 | AIR | 0.000000 | 18.3 |

TABLE 6A (ASPHERIC CONSTANTS)

| | SRF | | | | |
|---|---|---|---|---|---|
| | 6 | 15 | 20 | 22 | 30 |
| K | 0 | 0 | 0 | 0 | 0 |
| C1 | 7.755533E−08 | −1.600937E−08 | 1.315543E−08 | −1.127530E−07 | −1.127530E−07 |
| C2 | 2.915783E−13 | 4.594931E−13 | 4.240140E−13 | −6.485649E−12 | −6.485649E−12 |
| C3 | 3.242725E−16 | −2.152507E−17 | −3.086953E−17 | −5.379774E−16 | −5.379774E−16 |
| C4 | −1.613865E−20 | 1.639725E−22 | 1.194162E−21 | −1.196443E−20 | −1.196443E−20 |
| C5 | 6.406211E−25 | 2.379897E−27 | −2.653523E−26 | −5.528595E−25 | −5.528595E−25 |
| C6 | −6.919464E−29 | −9.162650E−32 | 2.378930E−31 | −7.495206E−28 | −7.495206E−28 |

| | SRF | | | | |
|---|---|---|---|---|---|
| | 39 | 41 | 43 | 46 | 49 |
| K | 0 | 0 | 0 | 0 | 0 |
| C1 | −2.049783E−08 | −4.052135E−08 | 5.855963E−08 | 2.843850E−08 | 8.270904E−09 |
| C2 | 2.725248E−13 | 2.052372E−12 | 2.438917E−12 | −4.414195E−13 | −2.602148E−13 |
| C3 | 3.884347E−17 | −4.250861E−17 | 1.460500E−16 | −1.517993E−17 | −1.465200E−17 |
| C4 | −2.771213E−21 | 9.740737E−21 | 1.538283E−20 | −9.077585E−23 | 3.928147E−22 |
| C5 | 1.376397E−25 | 1.542495E−24 | −2.400677E−24 | −2.410581E−26 | −3.026765E−27 |
| C6 | 1.207569E−30 | −1.284850E−28 | 2.227716E−28 | 9.460347E−31 | −1.741659E−32 |

| | SRF | |
|---|---|---|
| | 58 | 60 |
| K | 0 | 0 |
| C1 | −1.093190E−08 | −1.549783E−07 |
| C2 | −5.705862E−13 | −3.076425E−11 |
| C3 | 2.319699E−16 | 3.348549E−15 |
| C4 | −5.474292E−20 | −6.902709E−19 |
| C5 | 4.086757E−24 | 2.967519E−23 |
| C6 | −1.351655E−28 | −9.293565E−28 |

What is claimed is:

1. An optical system for ultraviolet light having wavelengths $\lambda \leq 200$ nm comprising:
   a plurality of optical elements comprising optical elements made of synthetic quartz glass or a fluoride crystal material transparent to a wavelength $\lambda \leq 200$ nm;
   at least two of the optical elements being utilized for forming at least one liquid lens group comprising
   a first delimiting optical element;
   a second delimiting optical element; and
   a liquid lens, which is arranged in an interspace between the first delimiting optical element and the second delimiting optical element and contains a liquid transparent to ultraviolet light having wavelengths $\lambda \leq 200$ nm.

2. The optical system as claimed in claim 1, which is an imaging system for imaging a pattern arranged in a first field surface into a second field surface which is optically conjugate with respect to the first field surface, at least one pupil surface lying between the field surfaces and the liquid lens being arranged in a region of the optical system that is near the pupil surface, a marginal ray height of the imaging being larger than a principal ray height in the region near the pupil surface.

3. The optical system as claimed in claim 2, wherein the liquid lens is arranged in a region which is near a pupil surface and in which the marginal ray height of the imaging is at least twice as large as the principal ray height.

4. The optical system as claimed in claim 1, wherein the imaging system contains at least one intermediate image and at least two pupil surfaces, the liquid lens being arranged in the region of large marginal ray heights in the vicinity of that pupil surface with the largest absolute marginal ray height.

5. The optical system as claimed in claim 1, wherein the liquid has, at an operating wavelength of the optical system, a dispersion $D_L$ greater than the dispersion $D_S$ of the highest dispersive solid material used for the optical elements at the operating wavelength, and wherein the interspace has the form of a negative lens.

6. The optical system as claimed in claim 5, wherein at least one of the delimiting optical elements is a positive lens.

7. The optical system as claimed in claim 6, wherein the positive lens consists of a fluoride crystal material.

8. The optical system as claimed in claim 1, wherein the first delimiting optical element and the second delimiting optical element consists essentially of synthetic quartz glass and the liquid used for forming the liquid lens consists essentially of water ($H_2O$).

9. The optical system as claimed in claim 1, wherein the liquid has, at an operating wavelength of the optical system, a dispersion $D_L$ less than the dispersion $D_S$ of the least dispersive solid material used for the optical elements at the operating wavelength, and wherein the interspace has the form of a positive lens.

10. The optical system as claimed in claim 9, wherein at least one of the delimiting optical elements is a negative lens.

11. The optical system as claimed in claim 10, wherein the negative lens consists essentially of calcium fluoride.

12. The optical system as claimed in claim 10, wherein the negative lens consists essentially of synthetic quartz glass.

13. The optical system as claimed in claim 1, wherein the liquid used for forming the liquid lens consists essentially of water ($H_2O$).

14. The optical system as claimed in claim 1, wherein the liquid has added to it at least one additive that alters at least one of the refractive index of the liquid and the dispersion of the liquid.

15. The optical system as claimed in claim 1, wherein the liquid used for forming the liquid lens consists essentially of a perfluoropolyether.

16. The optical system as claimed in claim 1, wherein the liquid used for the liquid lens is incompatible with the optical material of an optical element delimiting the interspace, and an interface of the optical element that faces the liquid is provided with an optical protective layer that is substantially impermeable to the liquid.

17. The optical system as claimed in claim 16, wherein the liquid consists essentially of water and the optical element provided with the protective layer consists essentially of calcium fluoride.

18. The optical system as claimed in claim 17, wherein the protective layer is formed by a single material layer.

19. The optical system as claimed in claim 17, wherein the protective layer is a single layer made of silicon dioxide.

20. The optical system as claimed in claim 17, wherein the protective layer is formed by a layer stack having at least two material layers lying one above the other and made of different dielectric materials in a dielectric alternating layer system.

21. The optical system as claimed in claim 1, which is a catadioptric projection objective for microlithography for imaging a pattern arranged in a first field surface into a second field surface which is optically conjugate with respect to the first field surface, at least two intermediate images and at least three pupil surfaces being arranged between the field surfaces.

22. The optical system as claimed in claim 21, wherein the projection objective comprises an even number of concave mirrors and all the concave mirrors are arranged in a region which is remote from a pupil surface and in which a principal ray height of the imaging is larger than a marginal ray height.

23. The optical system as claimed in claim 22, wherein the projection objective has a straight optical axis common to all the optical elements.

24. The optical system as claimed in claim 1, which is a projection objective for microlithography for imaging a pattern arranged in a first field surface into a second field surface which is optically conjugate with respect to the first field surface, which in conjunction with an immersion liquid arranged between a last optical element of the projection objective and the second field surface has a numerical aperture NA>1.0.

25. The optical system as claimed in claim 21, the projection objective having precisely one concave mirror in the vicinity of a pupil surface and comprising a first folding mirror for deflecting the radiation coming from the first field surface to the concave mirror and a second folding mirror for deflecting the radiation coming from the concave mirror to the second field surface.

26. The optical system as claimed in claim 1, wherein the liquid lens group is constructed as a manipulator for dynamically influencing the imaging quality of the optical system.

27. The optical system as claimed in claim 1, wherein a pressure generating device is connected to the interspace between the first and second delimiting optical elements, by means of which pressure generating device the liquid pressure of the liquid of the liquid lens is at least one of: increased above an ambient pressure prevailing within the optical system, and decreased below said pressure, in a manner dependent on external control signals.

28. The optical system as claimed in claim 1, wherein at least one of the delimiting optical elements is formed to be elastically deformable in a manner dependent on the liquid pressure.

29. The optical system as claimed in claim 1, wherein the liquid lens group is designed as a hydraulically manipulable liquid lens group having substantially no refractive power in a neutral position, and a transparent element with substantial refractive power is produced by increasing or decreasing the liquid pressure of the liquid lens proceeding from the neutral position.

30. The optical system as claimed in claim 1, wherein the liquid used for forming the liquid lens consists essentially of one of a cyclic hydrocarbon and a polycyclic hydrocarbon.

31. The optical system as claimed in claim 30, wherein the liquid used for forming the liquid lens consists essentially of a polycyclic saturated hydrocarbon.

32. The optical system as claimed in claim 31, wherein the polycyclic saturated hydrocarbon is decahydronaphtalin.

* * * * *